United States Patent
Sodagar

(10) Patent No.: US 12,388,879 B2
(45) Date of Patent: *Aug. 12, 2025

(54) METHODS FOR DISCOVERY OF MEDIA CAPABILITIES OF 5G EDGE

(71) Applicant: TENCENT AMERICA LLC, Palo Alto, CA (US)

(72) Inventor: Iraj Sodagar, Palo Alto, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/541,048

(22) Filed: Dec. 15, 2023

(65) Prior Publication Data
US 2024/0137393 A1    Apr. 25, 2024

Related U.S. Application Data

(63) Continuation of application No. 17/213,679, filed on Mar. 26, 2021, now Pat. No. 11,902,337.
(Continued)

(51) Int. Cl.
*H04L 65/1059* (2022.01)
*H04L 65/1063* (2022.01)
(Continued)

(52) U.S. Cl.
CPC ...... *H04L 65/1059* (2013.01); *H04L 65/1063* (2013.01); *H04L 65/60* (2013.01);
(Continued)

(58) Field of Classification Search
CPC . H04L 65/1059; H04L 65/1063; H04L 65/60; H04L 67/16; H04L 41/5009;
(Continued)

(56) References Cited

U.S. PATENT DOCUMENTS

| 8,806,031 B1* | 8/2014 | Kondur | H04L 41/0895 |
| | | | 709/228 |
| 2008/0112405 A1* | 5/2008 | Cholas | H04L 63/062 |
| | | | 370/389 |

(Continued)

FOREIGN PATENT DOCUMENTS

| JP | 2003-209566 A | 7/2003 |
| WO | 2020/033088 A1 | 2/2020 |

OTHER PUBLICATIONS

"3rd Generation Partnership Project; Technical Specification Group Services and System Aspects; 5G Media Streaming (5GMS); General description and architecture (Release 16)", 3GPP TS 26.501 V16.3.1, Mar. 2020, 63 pages (Year: 2020).*

(Continued)

*Primary Examiner* — Alex H. Tran
(74) *Attorney, Agent, or Firm* — Sughrue Mion, PLLC

(57) ABSTRACT

A method of managing capabilities of a media streaming network using at least one processor, including receiving a capability request for media streaming capabilities of an edge data network (EDN); determining the media streaming capabilities of the EDN; transmitting a capability response based on the determined media streaming capabilities; receiving a media processing workflow request based on the capability response; establishing a media streaming session according to the media processing workflow request; and streaming media content based on the media streaming session.

20 Claims, 24 Drawing Sheets

Related U.S. Application Data

(60) Provisional application No. 63/075,461, filed on Sep. 8, 2020, provisional application No. 63/066,692, filed on Aug. 17, 2020, provisional application No. 63/052,104, filed on Jul. 15, 2020, provisional application No. 63/026,432, filed on May 18, 2020, provisional application No. 63/021,411, filed on May 7, 2020.

(51) Int. Cl.
*H04L 65/60* (2022.01)
*H04L 67/51* (2022.01)
*H04N 21/647* (2011.01)
*H04W 4/20* (2018.01)

(52) U.S. Cl.
CPC .......... *H04L 67/51* (2022.05); *H04N 21/647* (2013.01); *H04W 4/20* (2013.01)

(58) Field of Classification Search
CPC . H04L 67/1008; H04L 67/1012; H04L 65/65; H04L 67/1004; H04L 67/101; H04N 21/647; H04W 4/20
See application file for complete search history.

(56) References Cited

U.S. PATENT DOCUMENTS

| | | | |
|---|---|---|---|
| 2008/0270610 | A1 | 10/2008 | John et al. |
| 2010/0198977 | A1 | 8/2010 | Shetty et al. |
| 2011/0090898 | A1* | 4/2011 | Patel .................. H04L 12/66 370/352 |
| 2017/0317894 | A1* | 11/2017 | Dao .................. H04L 41/5009 |
| 2018/0316746 | A1 | 11/2018 | Shattil |
| 2019/0098091 | A1* | 3/2019 | Shinde .................. H04L 67/125 |
| 2019/0349628 | A1* | 11/2019 | Cholas .................. H04N 21/4433 |
| 2019/0373443 | A1* | 12/2019 | Palaniappan .......... H04W 60/00 |
| 2020/0137642 | A1* | 4/2020 | Hong .................. H04L 65/40 |
| 2020/0404069 | A1* | 12/2020 | Li .................. H04W 8/24 |
| 2021/0136177 | A1* | 5/2021 | Hall .................. H04L 67/63 |
| 2021/0136178 | A1* | 5/2021 | Casey .................. H04L 47/823 |
| 2021/0219268 | A1* | 7/2021 | Li .................. H04L 1/08 |
| 2021/0243264 | A1* | 8/2021 | Yoon .................. H04L 41/5058 |
| 2021/0274418 | A1* | 9/2021 | Zhou .................. H04W 80/02 |
| 2021/0314391 | A1* | 10/2021 | Lee .................. H04W 48/18 |
| 2022/0369218 | A1* | 11/2022 | Gupta .................. H04W 48/18 |

OTHER PUBLICATIONS

"3rd Generation Partnership project; Technical Specification Group Services and System Aspects; Architecture for enabling Edge Applications; (Release 17)", 3GPP TS 23.558 V0.2.0, Apr. 2020, 55 pages (Year: 2020).*

"3rd Generation Partnership Project; Technical Specification Group Services and System Aspects; 5G Media Streaming (5GMS); General description and architecture (Release 16) Draft", 3GPP TS 26.501 V16.3.1, Mar. 2020, 68 pages; retrieved from https://www.3gpp.org/ftp/tsg_sa/WG4_CODEC/TSGS4_109-e/Inbox/ (Year: 2020).*

3rd Generation Partnership Project; Technical Specification Group Services and System Aspects; 5G Media Streaming (5GMS); General description and architecture (release 16).

3rd Generation Partnership project; Technical Specification Group Services and System Aspects; Architecture for enabling Edge Applications; (Release 17).

International Search Report dated Jul. 7, 2021 in International Application No. PCT/US21/27431.

Written Opinion of the International Searching Authority dated Jul. 7, 2021 in International Application No. PCT/US21/27431.

Communication dated Jul. 1, 2025 issued by Japanese Patent Office in Japanese Application No. 2024-037846.

* cited by examiner

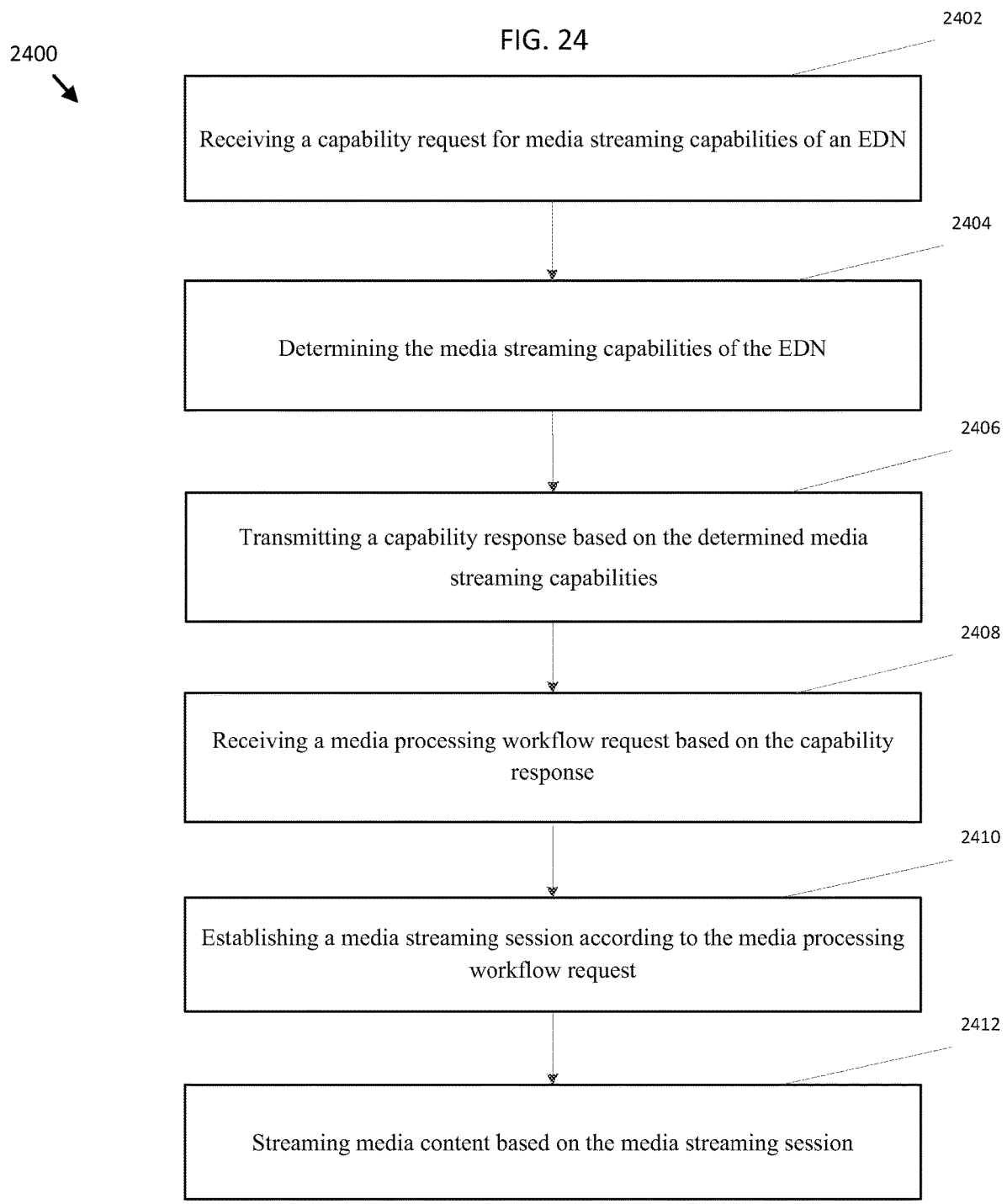

METHODS FOR DISCOVERY OF MEDIA CAPABILITIES OF 5G EDGE

CROSS-REFERENCE TO RELATED APPLICATION

This is a Continuation of U.S. patent application Ser. No. 17/213,679, filed on Mar. 26, 2021, which is priority from U.S. Provisional Application No. 63/021,411, filed on May 7, 2020, U.S. Provisional Application No. 63/066,692, filed on Aug. 17, 2020, U.S. Provisional Application No. 63/075,461, filed on Sep. 8, 2020, U.S. Provisional Application No. 63/026,432, filed on May 18, 2020, and U.S. Provisional Application No. 63/052,104, filed on Jul. 15, 2020, in the United States Patent and Trademark Office, the disclosure of which is incorporated herein by reference in its entirety.

FIELD

Embodiments of this disclosure are directed to media processing and streaming methods and systems, more particularly to discovery of network processing capabilities of 5G edge networks by external application servers, which allows the external application servers to learn about the current capabilities of the 5G network before requesting to set up any network-based processing.

BACKGROUND

Network and cloud platforms are used to run various applications. However, there is no standard based solution to describe the characteristics of a network or cloud platform or its elements.

3rd Generation Partnership Project (3GPP) TS26.501 defines the workflow for external application servers to establish network processing in 5G networks for uplink and downlink streaming applications.

European Telecommunications Standards Institute (ETSI) Multi-access Edge Computing (MEC) standard defines an architecture for instantiation, running, and managing applications on cloud platforms.

The current 5G Edge architecture defined in 3GPP TS23.558 only defines the general architecture and discovery of edge server hardware capabilities. It does not address the discovery of edge sever capabilities for media processing, which is more than raw hardware capabilities. It also does not address the environmental characteristics of the edge server.

In NBMP standard, the NBMP Source is the entity providing the workflow description to Workflow Manager to create, run, manage and monitor a media workflow. The interaction between NBMP Source and Workflow Manager is through a set of NBMP Operation APIs.

In the case of the 5G Streaming Media Architecture (5GMSA), the source device of media streams establishes an uplink session with an application function/application server (AF/AS) pairs in the network. A receiving device also establishes a downlink session with AF/AS to stream/download content from the network.

However, there is not edge computing architecture in 5GMSA that allows the deployment of network and edge processing or the split rendering of media streaming using the edge and network resources.

SUMMARY

According to one or more embodiments, a method of managing capabilities of a media streaming network using at least one processor includes receiving a capability request for media streaming capabilities of an edge data network (EDN); determining the media streaming capabilities of the EDN; transmitting a capability response based on the determined media streaming capabilities; receiving a media processing workflow request based on the capability response; establishing a media streaming session according to the media processing workflow request; and streaming media content based on the media streaming session.

According to one or more embodiments, a device for managing capabilities of a media streaming network includes at least one memory configured to store program code; and at least one processor configured to read the program code and operate as instructed by the program code, the program code including: first receiving code configured to cause the at least one processor to receive a capability request for media streaming capabilities of an edge data network (EDN); determining code configured to cause the at least one processor to determine the media streaming capabilities of the EDN; first transmitting code configured to cause the at least one processor to transmit a capability response based on the determined media streaming capabilities; second receiving code configured to cause the at least one processor to receive a media processing workflow request based on the capability response; establishing code configured to cause the at least one processor to establish a media streaming session according to the media processing workflow request; and streaming code configured to cause the at least one processor to stream media content based on the media streaming session.

According to one or more embodiments, a non-transitory computer-readable medium storing instructions, the instructions including: one or more instructions that, when executed by one or more processors of a device for managing capabilities of a media streaming network, cause the one or more processors to: receive a capability request for media streaming capabilities of an edge data network (EDN); determine the media streaming capabilities of the EDN; transmit a capability response based on the determined media streaming capabilities; receive a media processing workflow request based on the capability response; establish a media streaming session according to the media processing workflow request; and stream media content based on the media streaming session.

BRIEF DESCRIPTION OF THE DRAWINGS

Further features, the nature, and various advantages of the disclosed subject matter will be more apparent from the following detailed description and the accompanying drawings in which:

FIG. 24 is a flowchart of an example process for managing capabilities of a media streaming network, according to embodiments.

DETAILED DESCRIPTION

Figure 1:
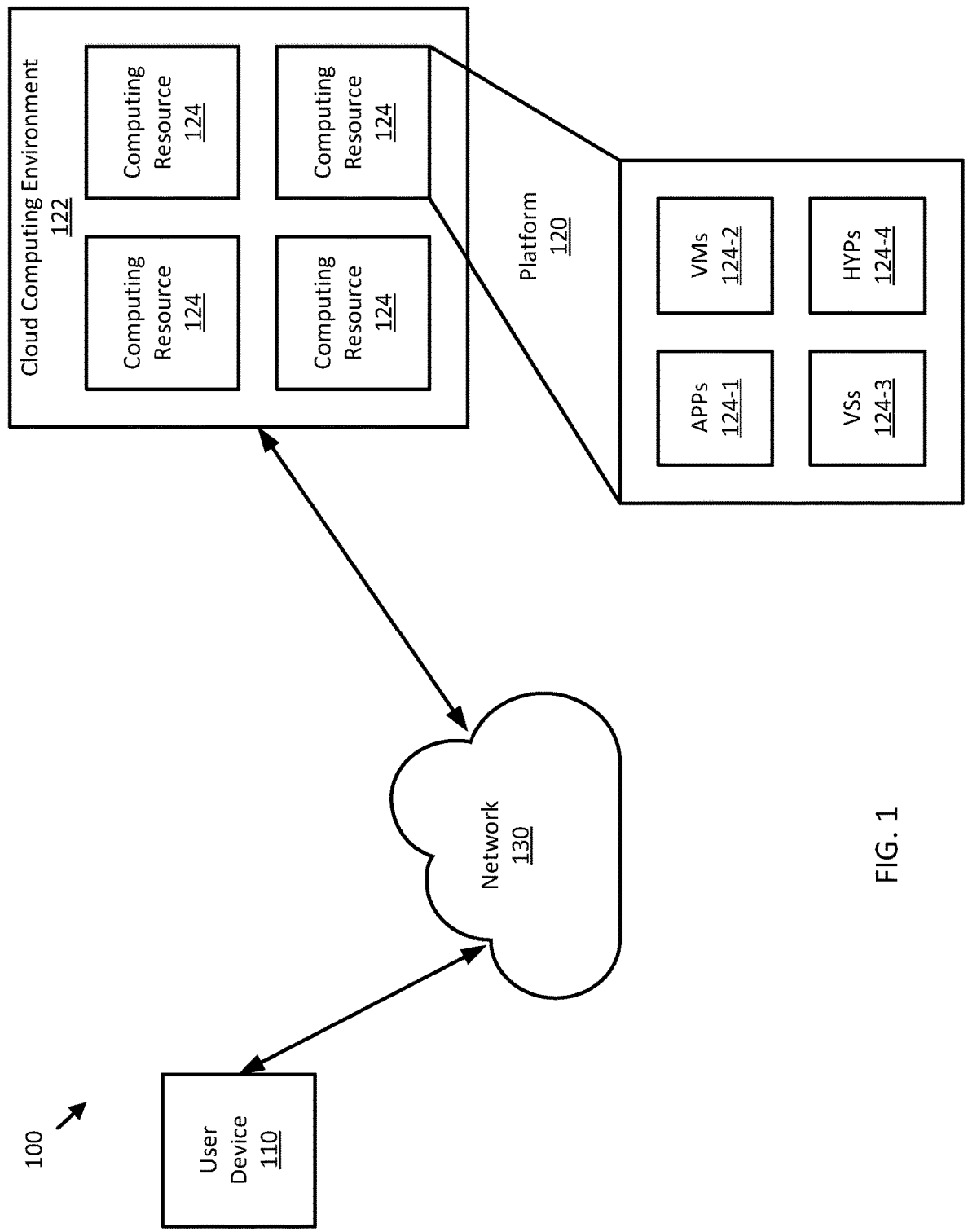
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
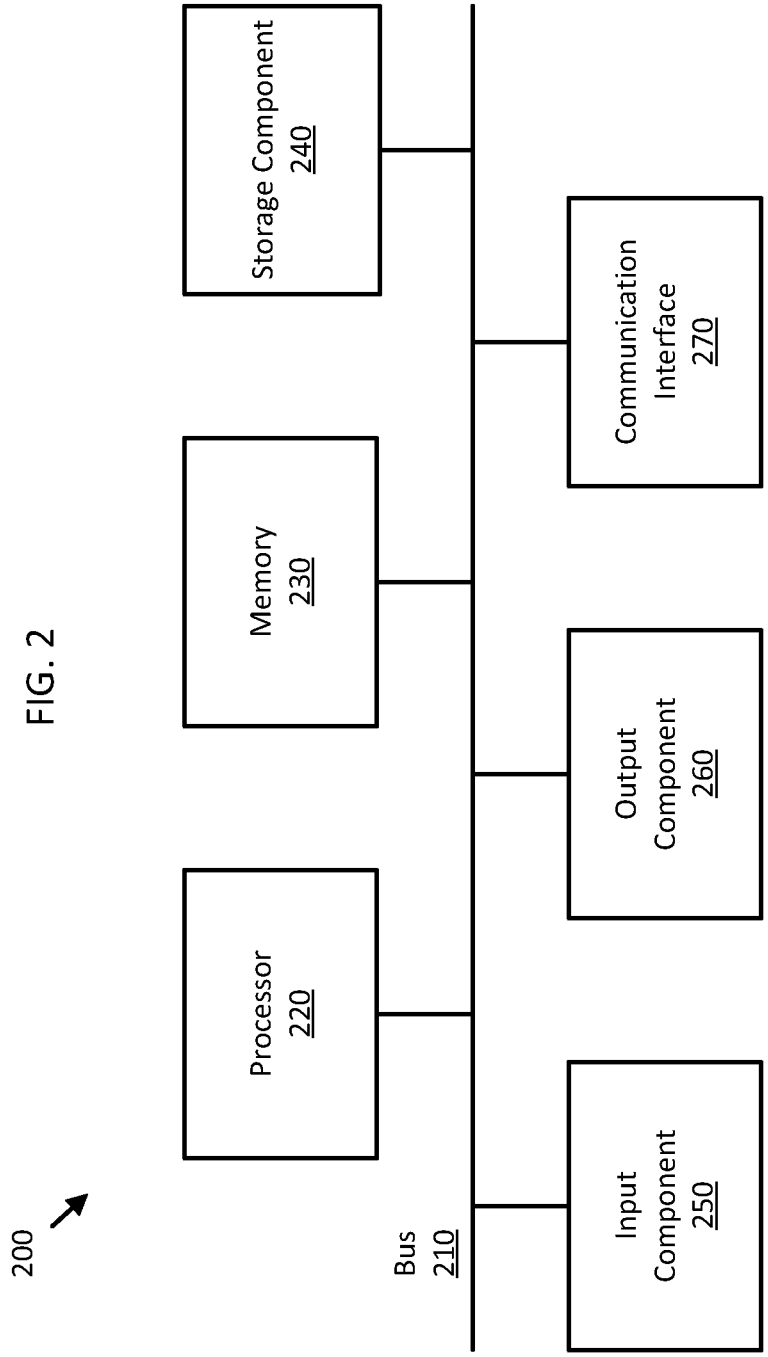
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
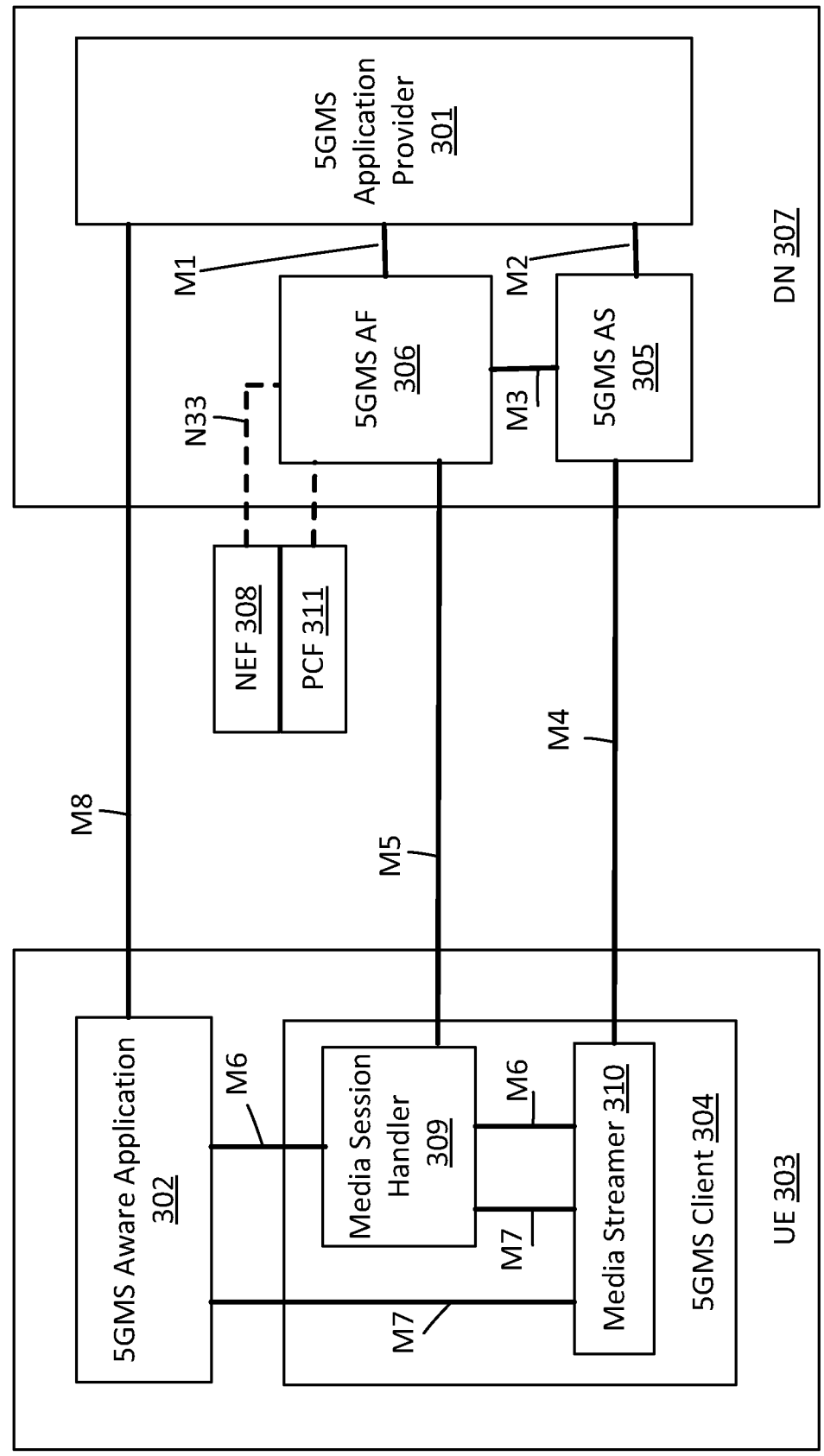
FIG. 3 is a block diagram of a network architecture for media streaming, according to embodiments.

FIG. 3 is a diagram of a media architecture 300 for media streaming. In embodiments, media architecture 300 may be used for uplink streaming or downlink streaming. A 5G media streaming uplink (5GMS) Application Provider 301 may use 5GMS for streaming services. 5GMS Application provider 301 may provide a 5GMS Aware Application 302 on the UE 303 to make use of 5GMS Client 304 and network functions using interfaces and APIs defined in 5GMS. 5GMS Application Server (AS) may be an AS dedicated to 5G Media Streaming. 5GMS Client 304 may be a UE 303 internal function dedicated to 5G Media Streaming.

5GMS Application Function (AF) 306 and 5GMS AS 305 may be Data Network (DN) 307 functions. Functions in trusted DNs may be trusted by the operator's network. Therefore, AFs in trusted DNs may directly communicate with all 5G Core functions. Functions in external DNs may only communicate with 5G Core functions via the Network Exposure Function (NEF) 308 using link 320.

The media architecture 300 may connect UE 303 internal functions and related network functions for 5G Media Uplink Streaming. Accordingly, media architecture 300 may include a number of functions. For example, 5GMS Client 304 on UE 303 may be an originator of 5GMS service that may be accessed through interfaces/APIs. 5GMS Client 304 may include two sub-functions, media session handler (MSH) 309 and media streamer 310. MSH 309 may communicate with the 5GMS AF 306 in order to establish, control and support the delivery of a media session. The MSH 309 may expose APIs that can be used by the 5GMS Aware Application 302. Media Streamer 310 may communicate with 5GMS AS 305 in order to stream the media content and provide a service to the 5GMS Aware Application 302 for media capturing and streaming, and the MSH 309 for media session control. 5GMS Aware Application 302 may control 5GMS Client 303 by implementing external application or content service provider specific logic and enabling the establishment of a media session. 5GMS AS 305 may host 5G media functions. 5GMS Application Provider 301 may be an external application or content specific media functionality, e.g., media storage, consumption, transcoding and redistribution that uses 5GMS to stream media from 5GMS Aware Application 302. 5GMS AF 306 may provide various control functions to the MSH 309 on the UE 303 and/or to 5GMS Application Provider 301. 5GMS AF 306 may relay or initiate a request for different Policy or Charging Function (PCF) 311 treatment or interact with other network functions.

Media architecture 300 may include a number of different interfaces. For example, link M1 may be a 5GMS Provisioning API exposed by 5GMS AF 306 to provision usage of media architecture 300 and to obtain feedback. Link M2 may be a 5GMS Publish API exposed by 5GMS AS 305 and used when 5GMS AS 305 in trusted DN, such as DN 307, is selected to receive content for streaming service. Link M3 may be an internal API used to exchange information for content hosting on 5GMS AS 305 within a trusted DN such as DN 307. Link M4 may be a Media Uplink Streaming API exposed by 5GMS AS 323 to Media Streamer 310 to stream media content. Link M5 may be a Media Session Handling API exposed by 5GMS AF 305 to Media Session Handler for media session handling, control and assistance that also include appropriate security mechanisms e.g. authorization and authentication. Link M6 may be a UE 303 Media Session Handling API exposed by MSH 309 to 5GMS Aware Application 302 to make use of 5GMS functions. Link M7 may be a UE Media Streamer API exposed by Media Streamer 310 to 5GMS Aware Application 302 and MSH 309 to make use of Media Streamer 310. Link M8 may be an Application API which is used for information exchange between 5GMS Aware Application 302 and 5GMS Application Provider 301, for example to provide service access information to the 5GMS Aware Application 302.

Figure 4:
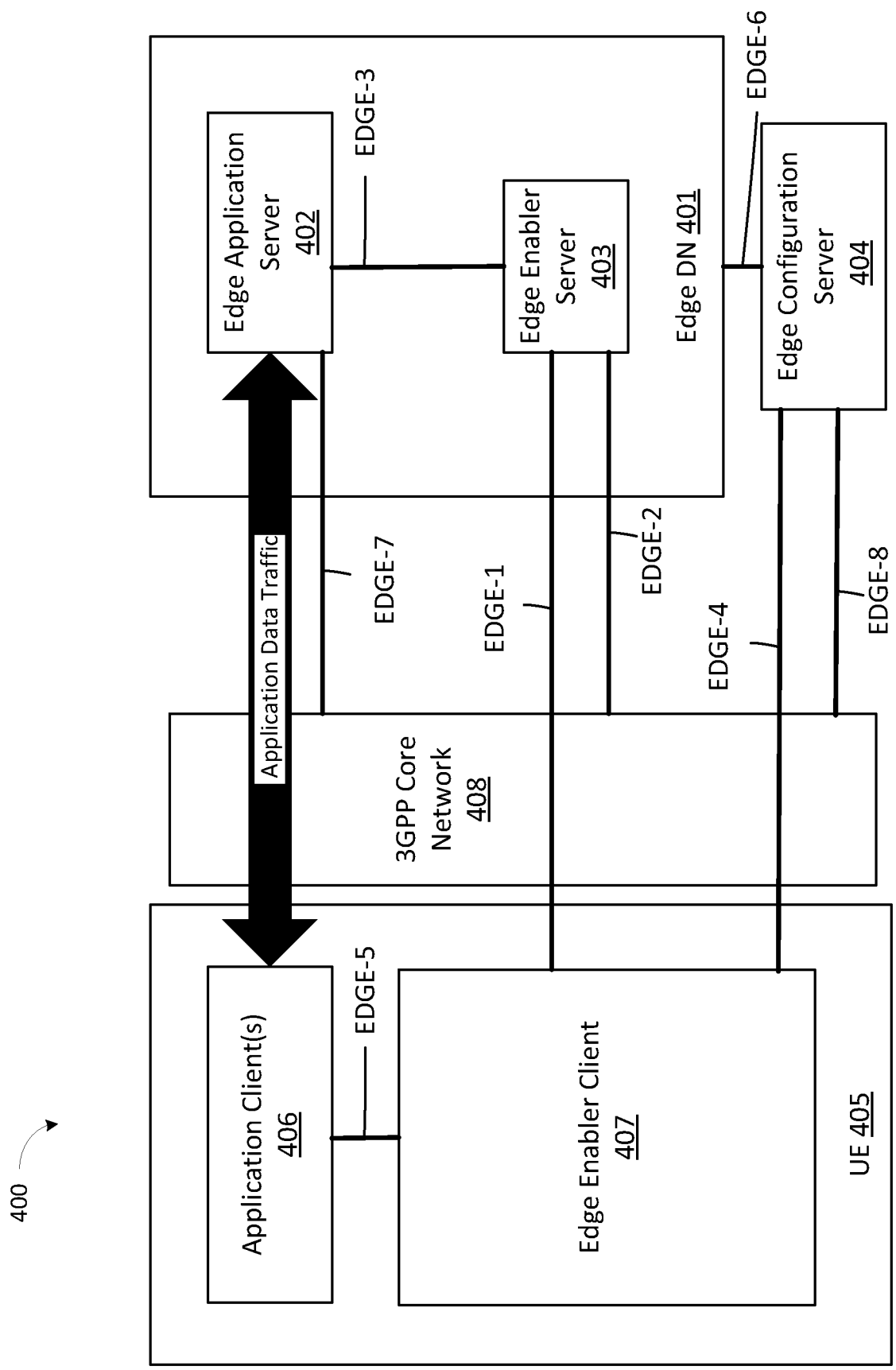
FIG. 4 is a block diagram of a network architecture for media streaming, according to embodiments.

FIG. 4 is a diagram of a 5G edge network architecture 400, according to embodiments. Edge Data Network (EDN) 401 is a local Data Network. Edge Application Server (EAS) 402 and Edge Enabler Server (EES) 403 are contained within the EDN 401. Edge Configuration Server (ECS) 404 provides configurations related to EES 403, including details of EDN 401 hosting EES 403. User Equipment (UE) 405 contains Application Client (AC) 406 and Edge Enabler Client (EEC) 407. EAS 402, EES 403 and ECS 404 may interact with the 3GPP Core Network 408.

EES 403 provides supporting functions needed for EAS 402 and EEC 407. Functionalities of EES 403 may include: provisioning of configuration information to EEC 407, enabling exchange of application data traffic with EAS; supporting the functionalities of API invoker and API exposing function, for example as specified in 3GPP TS 23.222; interacting with 3GPP Core Network 408 for accessing the capabilities of network functions either directly (e.g. via PCF) or indirectly (e.g. via Service Capability Exposure Function (SCEF)/NEF/SCEF+NEF); supporting the functionalities of application context transfer; supporting external exposure of 3GPP network and service capabilities to EASs 402 over link EDGE-3; supporting the functionalities of registration (i.e., registration, update, and de-registration) for EEC 407 and EAS 402; and supporting the functionalities of triggering EAS 402 instantiation on demand.

EEC 407 provides supporting functions needed for AC 406. Functionalities of EEC 407 may include: retrieval and provisioning of configuration information to enable the exchange of Application Data Traffic with EAS 402; and discovery of EASs 402 available in the EDN 401.

ECS 404 provides supporting functions needed for the EEC 407 to connect with an EES 403. Functionalities of ECS 404 are: provisioning of Edge configuration information to the EEC 407, for example the information for the EEC 407 to connect to the EES 403 (e.g. service area information applicable to LADN); and the information for establishing a connection with EESs 403 (such as URI); supporting the functionalities of registration (i.e., registration, update, and de-registration) for the EES 403; supporting the functionalities of API invoker and API exposing function as specified in 3GPP TS 23.222; and interacting with 3GPP Core Network 408 for accessing the capabilities of network functions either directly (e.g. PCF) or indirectly (e.g. via SCEF/NEF/SCEF+NEF).

AC 406 is the application resident in the UE 405 performing the client function.

EAS 402 is the application server resident in the EDN 401, performing the server functions. The AC 406 connects to EAS 402 in order to avail the services of the application with the benefits of Edge Computing. It is possible that the server functions of an application are available only as an EAS 402. However, it is also possible that certain server functions are available both at the edge and in the cloud, as an EAS 402 and an Application Server resident in the cloud respectively. The server functions offered by an EAS 402 and its cloud Application Server counterpart may be the same or may differ; if they differ, the Application Data Traffic exchanged with the AC may also be different. EAS 402 may consume the 3GPP Core Network 408 capabilities in different ways, such as: it may invoke 3GPP Core Network 408 function APIs directly, if it is an entity trusted by the 3GPP Core Network 408; it may invoke 3GPP Core Network 408 capabilities through EES 403; and it may invoke the 3GPP Core Network 408 capability through the capability exposure functions i.e. SCEF or NEF.

Architecture 400 may include a number of different interfaces for enabling edge applications, which may be referred to as reference points. For example, link EDGE-1 may be a reference point which enables interactions between the EES 403 and the EEC 407. It supports: registration and de-registration of EEC 407 to EES 403; retrieval and provisioning of EAS 402 configuration information; and discovery of EASs 402 available in the EDN 401.

Link EDGE-2 may be a reference point which enables interactions between EES 403 and the 3GPP Core Network 408. It supports: access to 3GPP Core Network 408 functions and APIs for retrieval of network capability information, e.g. via SCEF and NEF APIs as defined in 3GPP TS 23.501, 3GPP TS 23.502, 3GPP TS 29.522, 3GPP TS 23.682, 3GPP TS 29.122; or with EES 403 deployed within the MNO trust domain (see 3GPP TS 23.501 clause 5.13, 3GPP TS 23.503, 3GPP TS 23.682) Link EDGE-2 may reuse 3GPP reference points or interfaces of EPS or 5GS considering different deployment models.

Link EDGE-3 may be a reference point which enables interactions between EES 403 and EASs 402. It supports: registration of EASs 402 with availability information (e.g. time constraints, location constraints); de-registration of EASs 402 from EES 403; discovery of target EAS 402 information to support application context transfer; providing access to network capability information (e.g. location information, Quality of Service (QoS) related information); and requesting the setup of a data session between AC 406 and EAS 402 with a specific QoS.

Link EDGE-4 may be a reference point which enables interactions between ECS 404 and EEC 407. It supports: provisioning of Edge configuration information to the EEC 407.

Link EDGE-5 may be a reference point which enables interactions between AC and EEC 407.

Link EDGE-6 may be a reference point which enables interactions between ECS 404 and EES 403. It supports: registration of EES 403 information to ECS 404.

Link EDGE-7 may be a reference point which enables interactions between EAS 402 and the 3GPP Core Network 408. It supports: access to 3GPP Core Network 408 functions and APIs for retrieval of network capability information, e.g. via SCEF and NEF APIs as defined in 3GPP TS 23.501, 3GPP TS 23.502, 3GPP TS 29.522, 3GPP TS 23.682, 3GPP TS 29.122; or with EAS 402 deployed within the MNO trust domain (see 3GPP TS 23.501 clause 5.13, 3GPP TS 23.682) Link EDGE-7 may reuse 3GPP reference points or interfaces of EPS or 5GS considering different deployment models.

Link EDGE-8 may be a reference point which enables interactions between the ECS 404 and the 3GPP Core Network 408. It supports: a) access to 3GPP Core Network 408 functions and APIs for retrieval of network capability information, e.g. via SCEF and NEF APIs as defined in 3GPP TS 23.501, 3GPP TS 23.502, 3GPP TS 29.522, 3GPP TS 23.682, 3GPP TS 29.122; and with the ECS 404 deployed within the MNO trust domain (see 3GPP TS 23.501 clause 5.13, 3GPP TS 23.682) Link EDGE-8 may reuse 3GPP reference points or interfaces of EPS or 5GS considering different deployment models.

Figure 5:
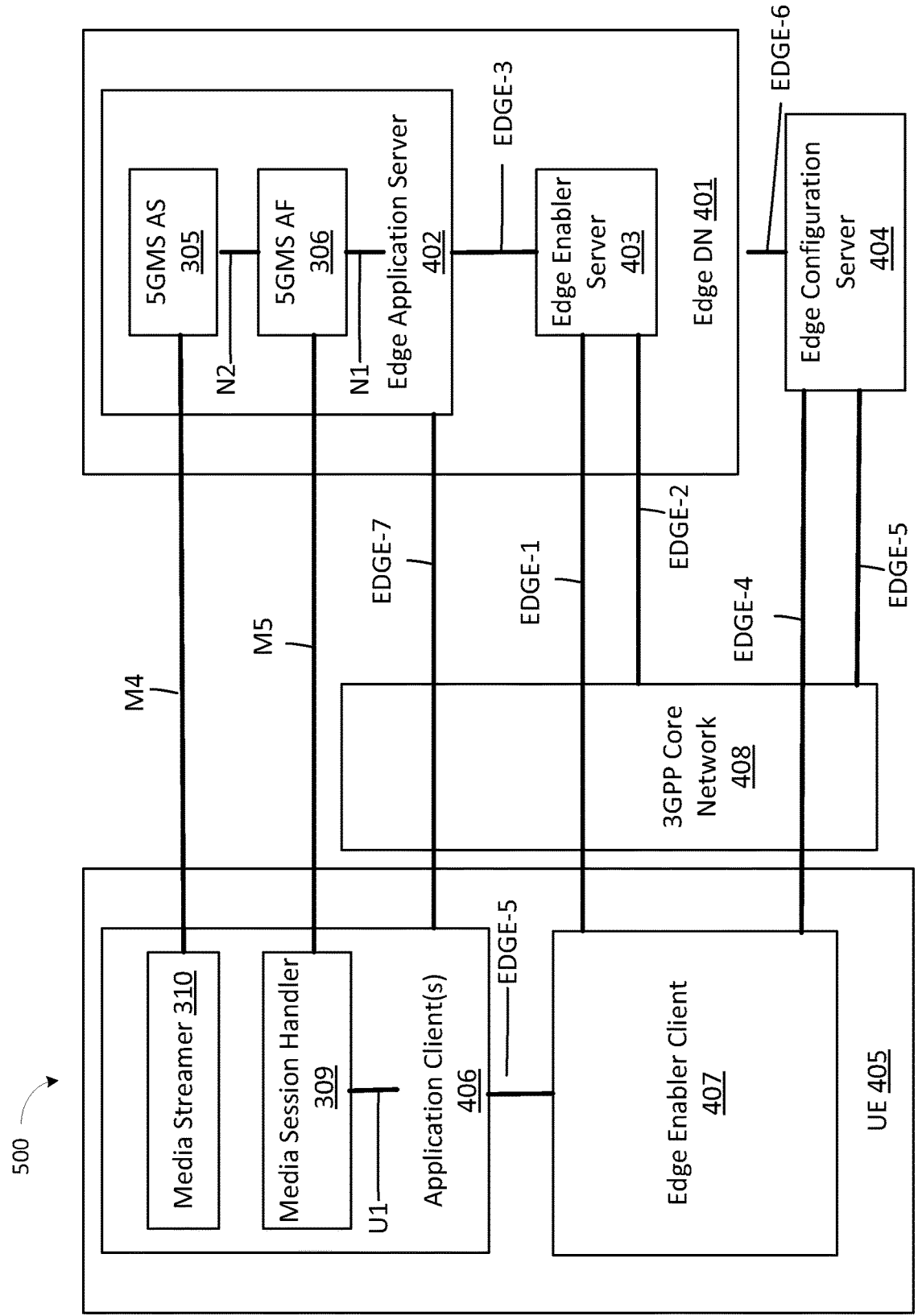
FIG. 5 is a block diagram of a network architecture for media streaming, according to embodiments.
Figure 6:
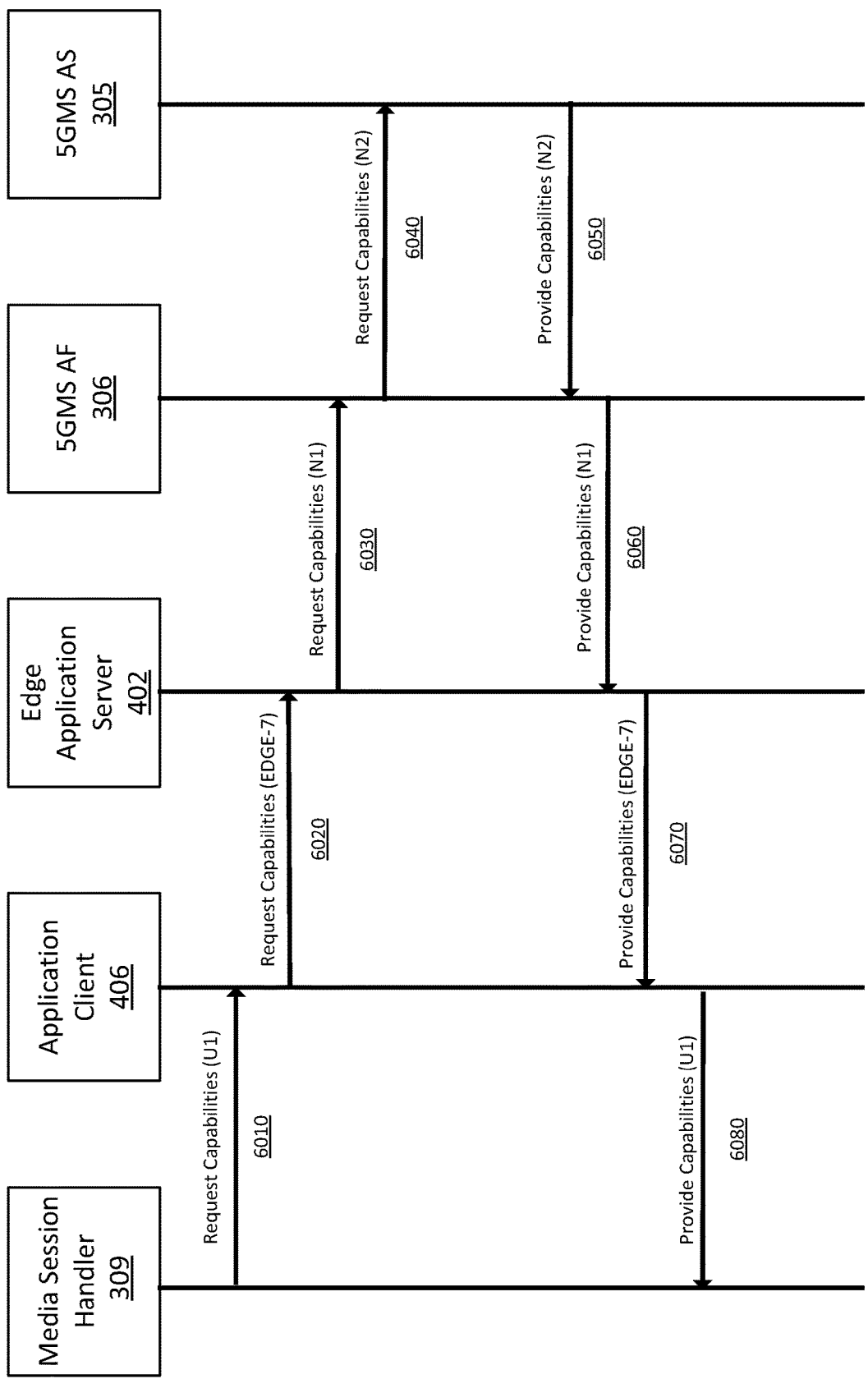
FIG. 6 is a block diagram illustrating an example process for network capability discovery, according to embodiments.
Figure 7:
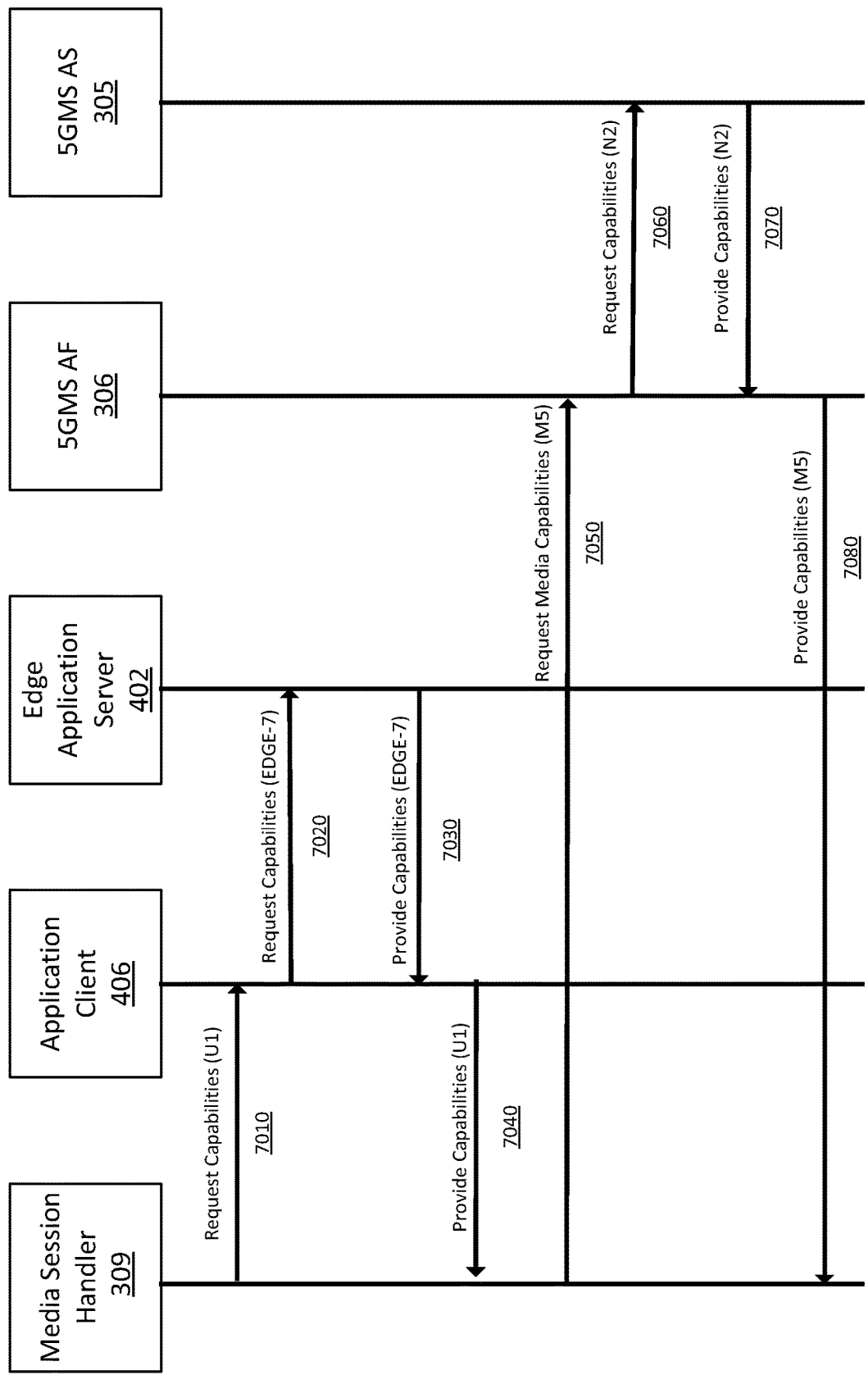
FIG. 7 is a block diagram illustrating an example process for network capability discovery, according to embodiments.

Embodiments corresponding to FIGS. 5-7 relate to workflows and procedures to discover the capabilities of the 5G network by the external entities in two stages, for example, 1. Discovery of hardware capabilities of Edge Application Server
2. Discovery of media-specific capabilities of Edge Application Server Before establishing the media processing workflow on an edge server, the processing capabilities of the edge server must be discovered. These capabilities may include:

1. Available hardware resources including processing units, storage, and network elements
2. The environmental characteristics including the operating system (OS), version of OS and other parameters
3. The throughput and delay range that the edge server can provide
4. The media processing function libraries, the functional description and input/output formats of the various functions such as
   a. Encoding, transcoding and multi-rate encoding into different formats
   b. Manifest generation
   c. Encryptions and content protection
   d. Content replacement such as ad insertion
   e. Added media such as closed caption, object detection, content filtering The current TS23.558 only addresses the first item. Embodiments provide an architecture and methods for discovery of the second to fourth items.

FIG. 5 illustrates an architecture 500 in which elements from architecture 400 of FIG. 4 are combined with elements from architecture 300 of FIG. 3. In order to avoid unnecessary duplication, redundant description has been omitted.

As shown in FIG. 5, media streamer 310 and MSH 309 are included in AC 406, and 5GMS AS 305 and 5GMS 306 are included in EAS 402. MSH 309 may communicate with AC 406 through link U1, 5GMS AS 305 may communicate with 5GMS AF 306 through link N2, and 5GMS AF 306 may communicate with EAS 402 through link N1.

FIG. 6 illustrates a process 600 which may relate to a call flow for discovering edge data network capabilities. Process 600 may be performed using architecture 500, or any other architecture as desired.

Process 600 may extend the TS23.558 APIs to enable the discovery of media capabilities of the edge data networks (EDNs).

As shown in FIG. 6, the capabilities discovery is performed by requesting and responding through link U1, link EDGE-7, link N1, and link N2 APIs, and in reverse.

According to process 600, at operation 6010, MSH 309 may send a request for processing capabilities to AC 406 using link U1. At operation 6020, AC 406 may send a request for processing capabilities to EAS 402 using link EDGE-7. At operation 6030, EAS 402 may send a request for processing capabilities to 5GMS AF 306 using link N1. At operation 6040, 5GMS AF 306 may send a request for processing capabilities to 5GMS AS 305 using link N2.

According to process 600, at operation 6050, 5GMS AS 305 may send a response including the processing capabilities to 5GMS AF 306 using link N2. At operation 6060, 5GMS AF 306 may send a response including the processing capabilities to EAS 402 using link N1. At operation 6070, EAS 402 may send a response including the processing capabilities to AC 406 using link EDGE-7. At operation 6080, AC 406 may send a response including the processing capabilities to MSH 309 using link U1.

Link EDGE-7 API is defined by TS23.558. To support the capability discovery shown herein, the link EDGE-7 API may be extended. Link U1, link N1, and link N2 may be internal APIs.

FIG. 7 illustrates a process 700 which may relate to a call flow for discovering edge data network capabilities. Process 700 may be performed using architecture 500, or any other architecture as desired.

Process 700 may use the TS23.558 APIs to discover the hardware capabilities of the edge data network, but use the direct API to discover media-specific capabilities.

As shown in FIG. 7, the capabilities discovery is performed by requesting and responding through U1, EDGE-7 at one stage (operations 7010-7040), and through M5, and N2 APIs in the second stage (operations 7050-7080).

According to process 700, at operation 7010, MSH 309 may send a request for processing capabilities to AC 406 using link U1. At operation 7020, AC 406 may send a request for processing capabilities to EAS 402 using link EDGE-7. At operation 7030, EAS 402 may send a response including the processing capabilities to AC 406 using link EDGE-7. At operation 7040, AC 406 may send a response including the processing capabilities to MSH 309 using link U1.

According to process 700, at operation 7050, MSH 309 may send a request for processing capabilities to 5GMS AF 306 using link M5. At operation 7060, 5GMS AF 306 may send a request for processing capabilities to 5GMS AS 305 using link N2. At operation 7070, 5GMS AS 305 may send a response including the processing capabilities to 5GMS AF 306 using link N2. At operation 7080, 5GMS AF 306 may send a response including the processing capabilities to MSH 309 using link M5.

Link EDGE-7 API is defined by TS23.558, and link M5 is defined in TS26.501. To support the capability discovery shown herein, the link EDGE-7 and link M5 APIs may be extended.

In process 700, MSH 309 may discover the hardware capabilities through link U1 and link EDGE-7 APIs, and the media-specific capabilities through link M5 API.

In tables throughout the disclosure, additional information is italicized. Further, a notation "M" indicates mandatory information, and a notation "O" indicates optional information. Throughout the disclosure, the terms "mandatory" and "optional" used in this way indicate that particular elements are considered to be mandatory or optional within a particular embodiment, and not within every embodiment.

Table 1 shows extensions for link EDGE-7 API to support media discovery functions according to FIGS. 5-7.

TABLE 1

Edge-7 extensions

| Information element | Status | Description | Used in |
| --- | --- | --- | --- |
| Maximum Request rate | O | Maximum request rate from the Application Client supported by the server. | Process 600 and Process 700 |
| Maximum Response time | O | The maximum response time advertised for the Application Client's service requests. | Process 600 and Process 700 |
| Availability | O | Advertised percentage of time the server is available for the Application Client's use. | Process 600 and Process 700 |
| Available Compute | O | The maximum compute resource available for the Application Client. | Process 600 and Process 700 |
| Available Graphical Compute | O | The maximum graphical compute resource available for the Application Client. | Process 600 and Process 700 |
| Available Memory | O | The maximum memory resource available for the Application Client. | Process 600 and Process 700 |
| Available Storage | O | The maximum storage resource available for the Application Client. | Process 600 and Process 700 |
| Supported environment | O | The OS and architecture | Callflow 1 and 2 |
| Flow Control | O | Flow control capabilities | Process 600 |
| Repository | O | List and location of repositories | Process 600 |
| Functions | O | List of built-in functions and workflows, and their performance | Process 600 |

Table 2 shows embodiments of example data extension for link M5 API to support media discovery functions according to FIGS. 5-7.

TABLE 2

M5 extensions

| Information element | Status | Description | Used in |
| --- | --- | --- | --- |
| Flow Control | O | Flow control capabilities | Process 600 |
| Repository | O | List and location of repositories | Process 600 |
| Functions | O | List of built-in functions and workflows, and their performance | Process 600 |

Tables 3-6 describe parameters added to link EDGE-7 and link M5 APIs in accordance with FIGS. 5-7.

TABLE 3

Static image information object

| Name | Definition |
| --- | --- |
| os | operation system |
| version | version number of operation system |
| architecture | hardware architecture |
| environment | environment |

TABLE 4

Flow control parameters

| Name | Definition |
| --- | --- |
| typical-delay | typical expected delay for the resource. |
| min-delay | minimum delay (i.e. amount time from input to output sample) adequate for this resource |
| max-delay | maximum delay required for this resource |
| typical-throughput | typical expected throughput for this resource |
| min-throughput | minimum bandwidth required for this resource |
| max-throughput | maximum bandwidth adequate for this resource |
| averaging-window | averaging window used to calculate the throughput. The default is one second. |

TABLE 5

Repository parameters

| Name | Definition |
| --- | --- |
| mode | Provides the mode for the repository preference.<br>The following values are allowed:<br>'strict': only the listed repositories in this descriptor shall be used for deployment of the workflow.<br>'preferred': the listed repositories in this descriptor shall be used first for the deployment of the workflow. If a Function is not found in these repositories, a different repository may be used.<br>'available': the listed repositories in this descriptor may be used first for the deployment of the workflow. Other repositories may also be used.<br>If more than one repository is listed, then the order of listing indicates the preference order of use from high to low, i.e. the first repository is the most preferred one.<br>The default value is 'available'. |
| Repository | Information about supported repositories |
| Location | Location of the Repository. It shall be a valid URL according to IETF RFC 3986. |
| name | Name of the Repository |
| description | Provides a human-readable description for the Repository |

As shown in Table 5, the supported repositories are described. Each repository includes a list of supported functions.

TABLE 6

Function Descriptions

| Name | Description |
| --- | --- |
| Scheme | Unique identifier |
| General | Description of the function including:<br>Name<br>Description<br>Brand<br>Compatibility with standards<br>keywords |
| Input | Description of inputs |
| Output | Description of outputs |
| Processing | Processing model and if it is consist of multiple functions |
| Requirements | The computational, memory, storage and bandwidth requirements |
| Configuration | The configuration parameter names and descriptions |
| Client-Assistance | Additional inputs during the operation |
| Assertion | Supported Assertion tests |
| Variables | Exposed variables |
| Events | Exposed events |
| Security | Security support |
| static image | The URL for the static image |
| Dynamic image request | Information for building the dynamic image including the scheme and patching URL. |

As shown in Table 6, the function descriptions describe the list of supported functions and their characteristics can be retrieved. These characteristics may include:
1. Supported input formats, codecs, and codec profiles/ levels, resolutions, frame rates
2. Transcoding with formats, output codecs, codec profiles/levels, bitrates, and others
3. Reformatting with output format,
4. Combination of input media streams, e.g. network-based stitching, mixing,
5. Recognition or synthesis of media Accordingly, embodiments may provide a method for discovering the 5G network capabilities by the application through 3GPP Edge APIs and a call flow wherein the 5G device gathers the currently available resources from application server including media capabilities, wherein the 3GPP Edge APIs are extended to provide media capabilities of the edge network to the application.

Embodiments may provide a method for discovering the 5G network capabilities by the application in two stages through 3GPP Edge APIs and then through 3GPP 5GMSA APIs, and a call flow wherein the 5G device gathers the currently available resources from application server including media capabilities, wherein the 3GPP Edge and 5GMSA APIs are extended to provide media capabilities of the edge network to the application.

Embodiments may provide a method of discovering 5G application server environment parameters, wherein the application can discover information about the 5G Application Server operation system, environment parameters, and related information to run 1st and 3rd party applications, libraries, and functions on the 5G Application Server.

Figure 8:
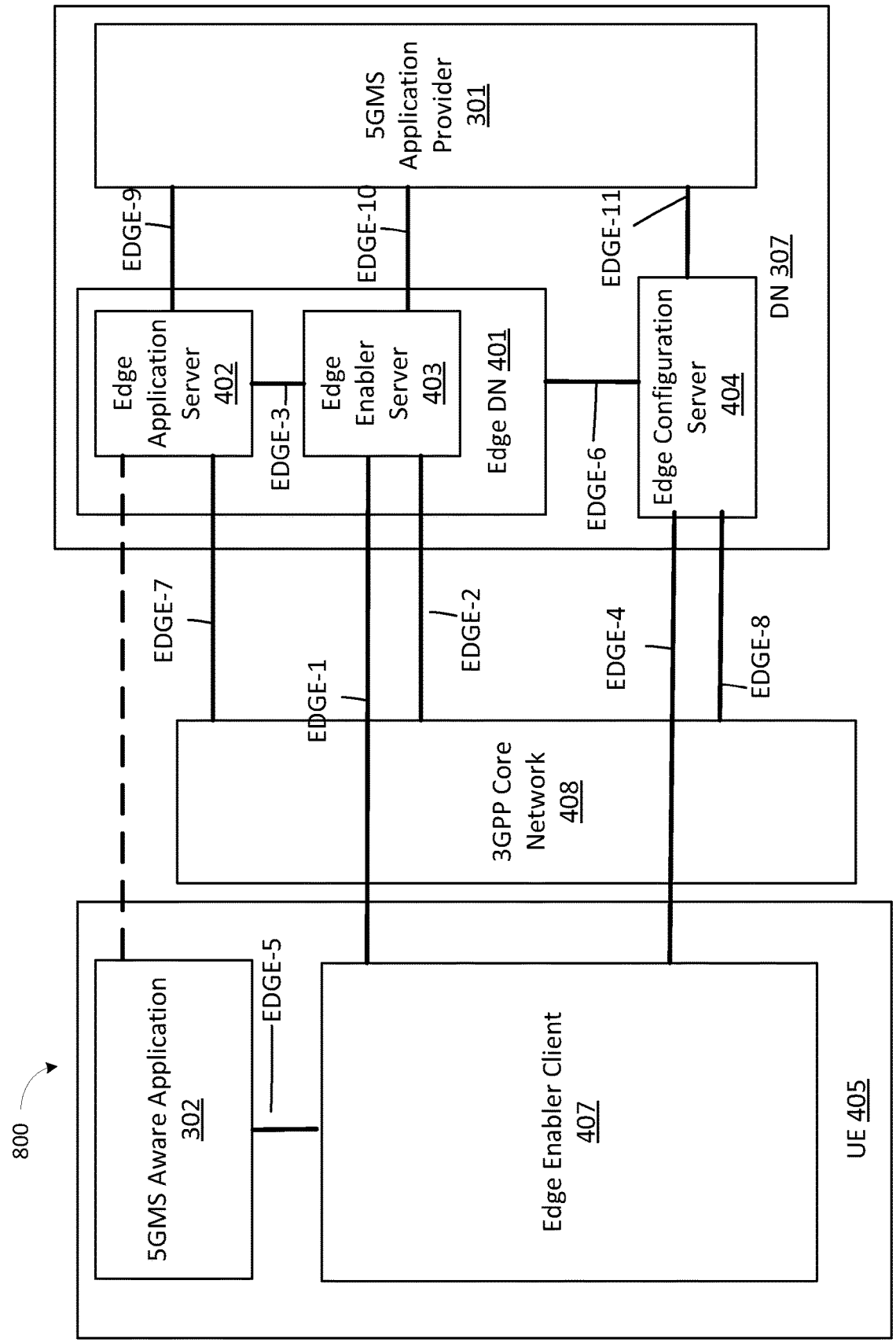
FIG. 8 is a block diagram of a network architecture for media streaming, according to embodiments.
Figure 9:
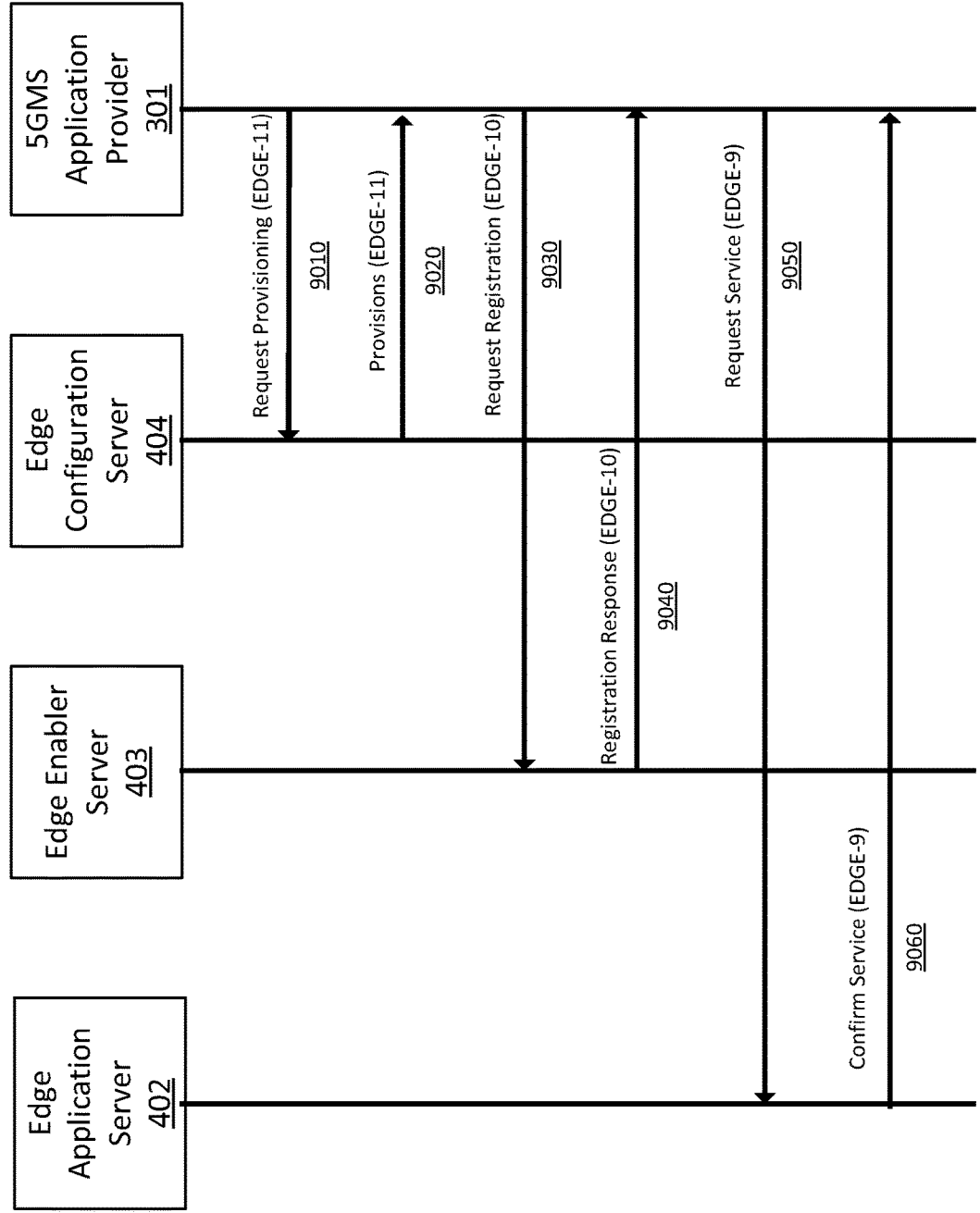
FIG. 9 is a block diagram illustrating an example process for network capability discovery, according to embodiments.
Figure 10:
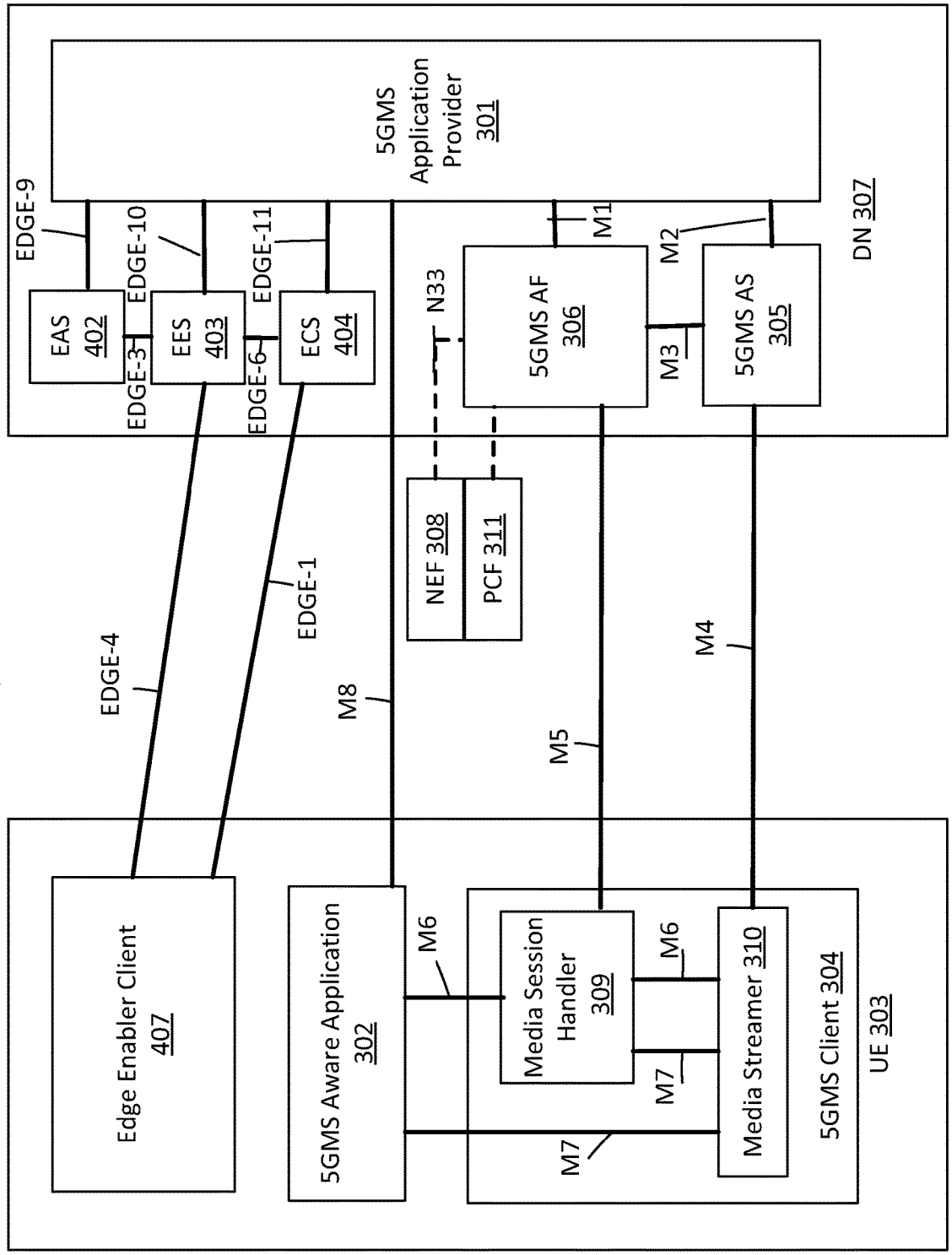
FIG. 10 is a block diagram of a network architecture for media streaming, according to embodiments.

Embodiments corresponding to FIGS. 8-10 may extend the 5G edge architectures discussed above to allow the following:
1. Discovery of available EASs 402 by a 5GMS AP 301
2. Discovery of any available EAS 402 capabilities by 5GMS AP 301

FIG. 8 illustrates an architecture 800 in which elements from architecture 400 of FIG. 4 are combined with elements from architecture 300 of FIG. 3. In order to avoid unnecessary duplication, redundant description has been omitted.

As shown in FIG. 8, link EDGE-9 allows communication between EAS 402 and 5GMS AP 301, link EDGE-10 allows communication between EES 403 and 5GMS AP 301, and link EDGE-11 allows communication between ECS 404 and 5GMS AP 301.

FIG. 9 illustrates a process 900 which may relate to a call flow for discovering Edge Data Network 401 capabilities. Process 900 may be performed using architecture 800, architecture 1000 discussed below, or any other architecture as desired.

Process 900 may extend the TS23.558 APIs to enable the discovery of media capabilities of the edge data networks by the 5GMS AP 301.

According to process 900, at operation 9010, 5GMS AP 301 may send a request for provisioning to ECS 404 using link EDGE-11. At operation 9020, ECS 404 provisions and provides a list of EESs 403 to 5GMS AP 301 using link EDGE-11. At operation 9030, 5GMS AP 301 requests registration from an EES 403 included in the list of EESs 403 using link EDGE-10. At operation 9040, EES 403 registers and provides a list and locations of EASs 402 to 5GMS AP 301 using link EDGE-10. At operation 9050, 5GMS AP 301 may request a service from an EAS 402 included in the list of EASs 402 using link EDGE-9. At operation 9050, EAS 402 starts running the service and confirms the service to 5GMS AP 301 using link EDGE-9, and 5GMS AP 301 connects to EAS 402 and uses the service FIG. 10 illustrates an architecture 1000 in which elements from architecture 400 of FIG. 4 are combined with elements from architecture 300 of FIG. 3. In order to avoid unnecessary duplication, redundant description has been omitted.

In FIG. 10, 5GMS AS 305 and 5GMS AF 306 as well as ECS 404 and EES 403 may be logical entities. All or some of them may be combined when implemented. EASs 402 may be multiple entities. From the point of view of 5GMS AS 305, all EAS 402 entities are part of the 5GMS AP 301.

Link M2 provides the media flow between 5GMS AS 305 and 5GMS AP 301. Because some or all of the application may be run on an EAS 402, 5GMS AS 305 may be connected to the EAS 402 through 5GMS AP 301.

Accordingly, in embodiments 5GMS AP 301 may discover the list and location of the EASs 402 directly.

In embodiments, 5GMS AP 301 may discover the capabilities of EASs 402.

In embodiments, 5GMS AP 301 may request service(s) from EAS 402 directly and instantiate and use those services.

In embodiments, 5GMS AP 301 may perform any above functions without going through UE 303.

In embodiments, the same resources that UE 303 uses to communicate with the EDN 401 can be used by the 5GMS AP 301 and no new resources are needed.

In embodiments, architecture 300 may be combined with architecture 400, providing a mechanism to set up media services on edge servers and providing a media flow between 5GMS AS 305 and EAS 402.

Accordingly, embodiments may provide a method for discovering the EDN 401 capabilities by the 5GMS AP 301 through new APIs and a call flow wherein the 5GMS AS 305 can discover the list of available edge servers, provision for a subset of them, discover the location and capabilities of the provisioned one, discover more details about a specific EAS 402, and then request a service from that server, wherein the currently standardized resources can be used to perform the above operations.

Embodiments may provide a method of combining 5G edge data network and 5G media data network where the two architectures are combined and control and data flow are arranged such that part of the media application may be run on an EAS 402 and the session can be established using the standard processes of 5G edge networks and 5G media streaming architecture.

Figure 11:
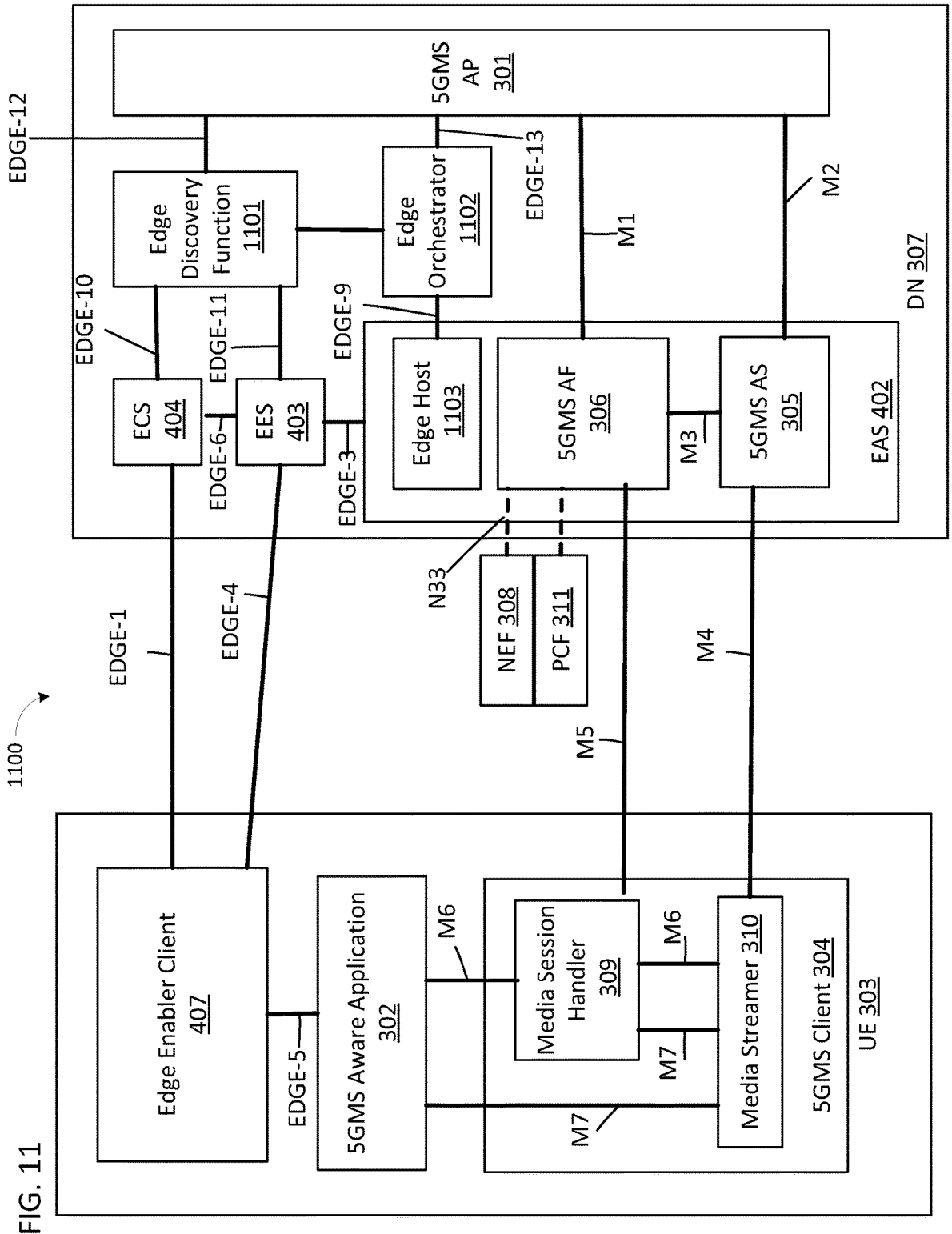
FIG. 11 is a block diagram of a network architecture for media streaming, according to embodiments.
Figure 12:
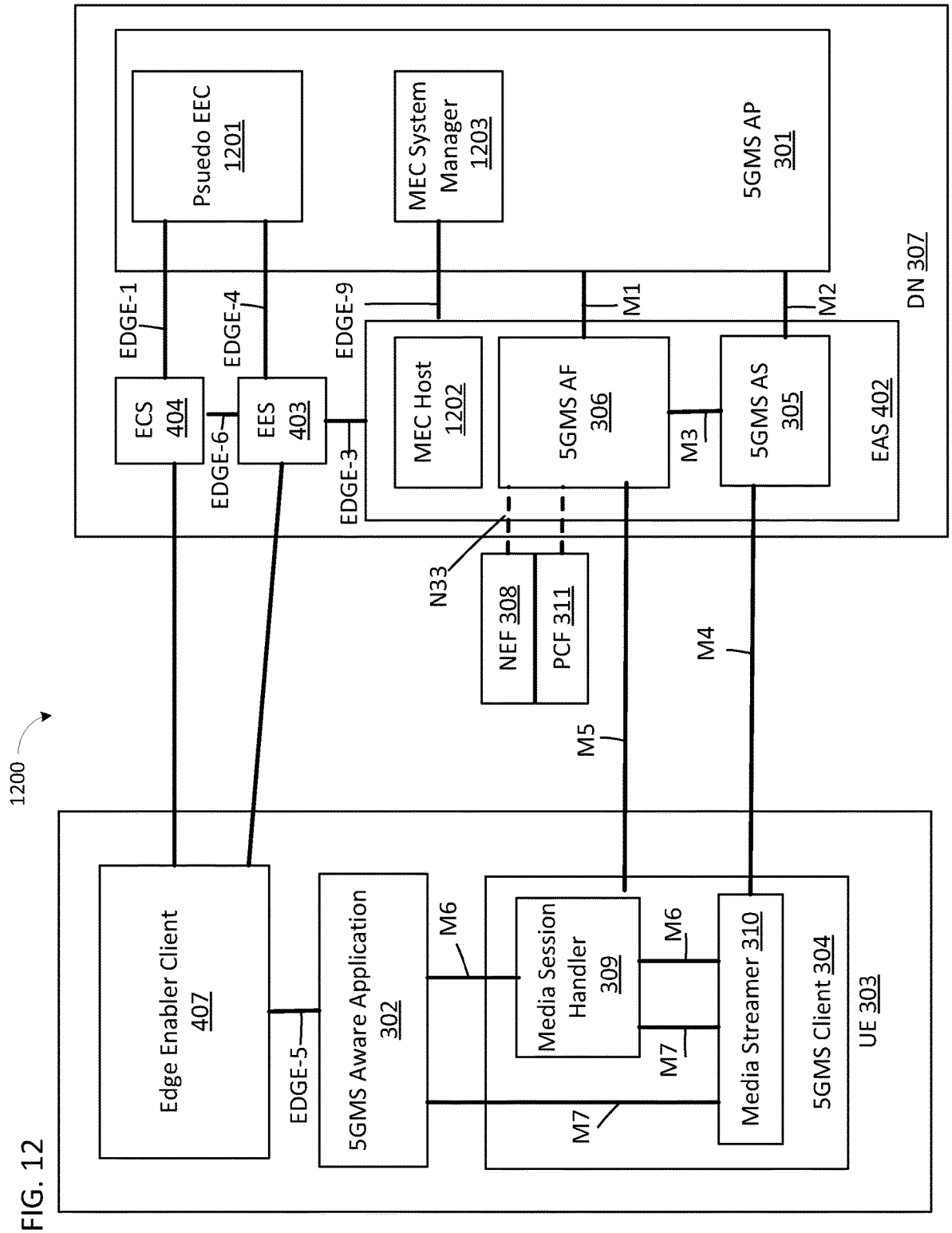
FIG. 12 is a block diagram of a network architecture for media streaming, according to embodiments.
Figure 13:
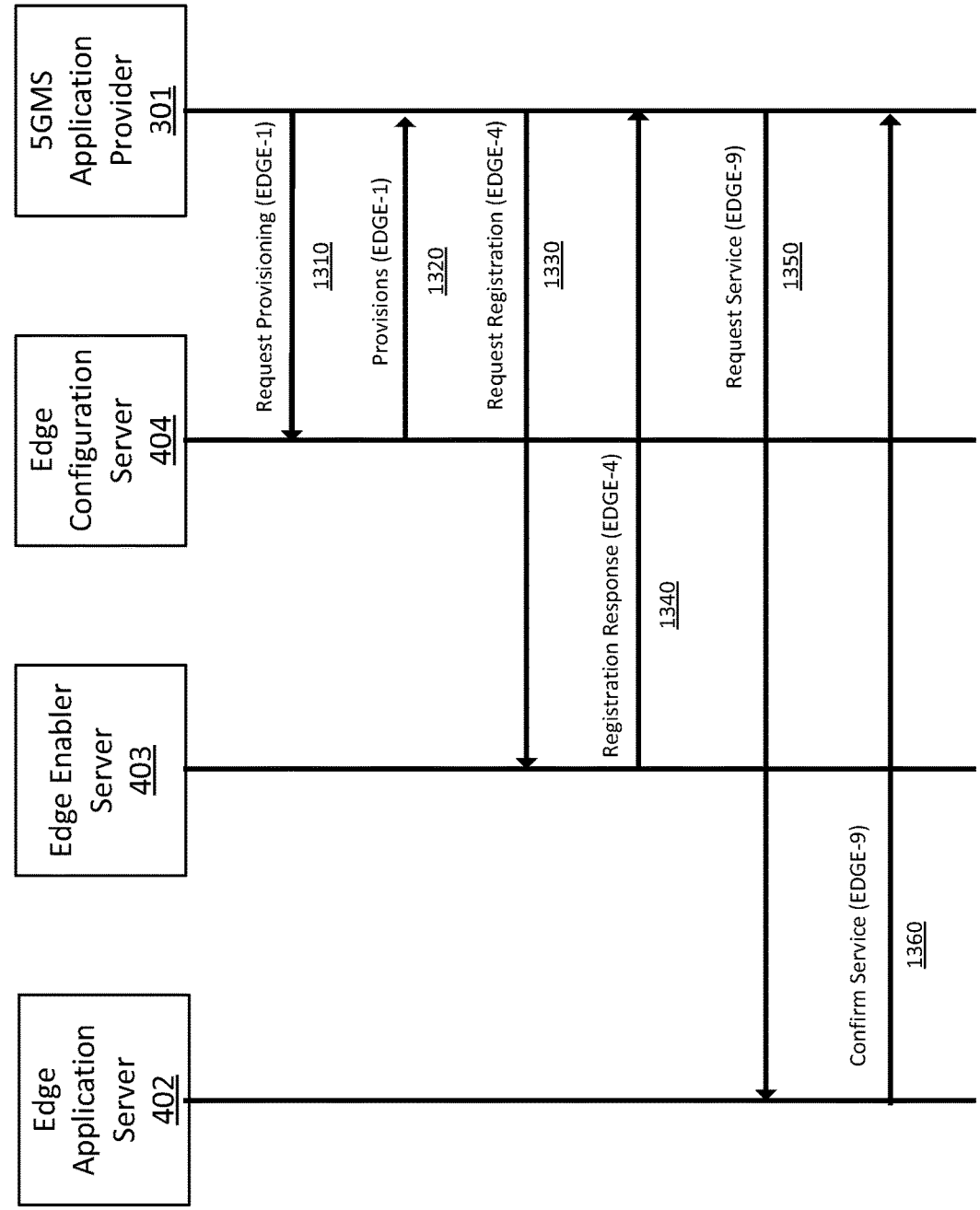
FIG. 13 is a block diagram illustrating an example process for network capability discovery, according to embodiments.

Embodiments corresponding to FIGS. 11-13 may extend the 5G edge architectures discussed above to allow the following:

1. An edge platform architecture extended using a "pseudo" Edge Enable Client 1201 in 5GMS AP 301.
2. Instantiation of 5GMS AF 305 and 5GMS AS 305 in an EAS 402
3. Support of MEC host 1202 or a similar function in EAS 402

FIGS. 11-12 illustrate architecture 1100 and architecture 1200 in which elements from architecture 400 of FIG. 4 are combined with elements from architecture 300 of FIG. 3, and additional elements are added. In order to avoid unnecessary duplication, redundant description has been omitted.

In FIG. 11, Edge Discovery Function (EDF) 1101 enables 5GMS AP 301 to discover EASs 402 and their capabilities. One way to realize this is to use a pseudo EEC 1201 as the EDF 1101. Then EDGE-10, EDGE-11 and EDGE-12 are EDGE-1, EDGE-4 and EDGE-5 respectively, as shown for example in FIG. 12 In embodiments, EDF 1101 can be potentially realized with a solution provided by SA2 or SA5. Edge Orchestrator (EO) 1102 may be an orchestration service for requesting running specific apps on the EAS 402. EO 1101 may be provided by 5G Network Operator. In embodiments, 5GMS AP 301 Provider may include an EO service function. Edge Host (EH) 1103 may be a service that manages running specific apps on the EAS 402.

FIG. 12 shows architecture 1200, which may be an example of architecture 1100 implemented using MEC. In FIG. 12, EDF 1101 is implemented using EEC functionality and link EDGE-1 is used for discovery. A MEC System Manager 1203 is used as EO 1101. MEC System manager 1203 can be implemented by 5G network operator, or by the 5GMS AP 301. The link M1 interface is used as link EDGE-9. A MEC Host 1202 is used as EH 1103.

FIG. 13 illustrates a process 1300 which may relate to a call flow for discovering Edge Data Network capabilities. Process 1300 may be performed using architecture 1200, architecture 1300, or any other architecture as desired.

According to process 1300, at operation 1310, 5GMS AP 301 may send a request for provisioning to ECS 404 using EDF 1101 and link EDGE-1. At operation 1320, ECS 404 provisions and provides a list of EESs 403 to 5GMS AP 301 using link EDGE-1. At operation 1330, 5GMS AP 301 requests registration from an EES 403 included in the list of EESs 403 using link EDGE-4. At operation 1340, EES 403 registers and provides a list and locations of EASs 402 to 5GMS AP 301 through EDF 1101 using link EDGE-4. At operation 1350, 5GMS AP 301 may request a service from an EAS 402 included in the list of EASs 402 using EO 1101 and link EDGE-9. At operation 1350, EAS 402 starts running the service and confirms the service to 5GMS AP 301 using link EDGE-9, and 5GMS AP 301 connects to EAS 402 and uses the service. For example, EAS 402 starts an instance of 5GMS AF 306 and 5GMS AS 305, MSH 309 and 5GMS AF 306 and 5GMS AS 305 may set up the media session, and the media streaming may start.

In embodiments, 5GMS AP 301 may discover the list, location, and capabilities of the EASs 402 directly using the existing edge standard.

In embodiments, 5GMS AP 301 may discover the EAS 402 capabilities directly using the existing edge standard.

In embodiments, 5GMS AP 301 may request service(s) from EAS 402 directly and instantiate and use those services using standards such as MEC.

In embodiments, 5GMS AP 301 may perform any above functions without going through UE 303.

In embodiments, the appropriate EAS 402 instantiates a single 5GMS AF 306 and 5GMS AS 305 and therefore the media will flow through this EAS 402.

In embodiments, the same resources that UE 303 uses to communicate with the EDN 401 can be used by the 5GMS AP 301 and no new resources are needed.

In embodiments, architecture 300 may be combined with architecture 400, providing a mechanism to set up media services on edge servers and providing a media flow between 5GMS AS 305 and EAS 402.

Accordingly, embodiments may provide a method for discovering the 5G edge data network capabilities by the 5GMS AP 301 through existing APIs using a pseudo client in the application and a call flow wherein the 5GMS AP 301 can discover the list of available edge servers, provision for a subset of them, discover the location and capabilities of the provisioned one, discover more details about a specific edge application server, and then request a service from that server using a standard orchestration solution, wherein the currently standardized resources can be used to perform the above operations.

Embodiments may provide a method of combining 5G edge data network, 5G media data network, and MEC architecture, where the three architectures are combined and control and data flow are arranged such that part of the media application may be run on an EAS 402 and the session can be established using the standard processes of 5G edge networks and 5G media streaming architecture.

Embodiments corresponding to FIGS. 14-18 may extend the 5G edge architectures discussed above to include 5G discovery server (DS) 1401 which may include the list of 5GMS AS 305 and, in embodiments, their capabilities. Embodiments relating to FIGS. 14-18 may relate to workflows and procedures to discover the associated 5GMS AF 306 locations and the capabilities of their corresponding 5GMS AS 305 by the 5GMS AP 301 in two stages:

1. Discovery of the list (and in some embodiments the 5GMS AS 305 capabilities) of available 5GMS AFs 306 in the DS 1401
2. Discovery of media-specific capabilities of a particular 5GMS AS 305

Figure 14:
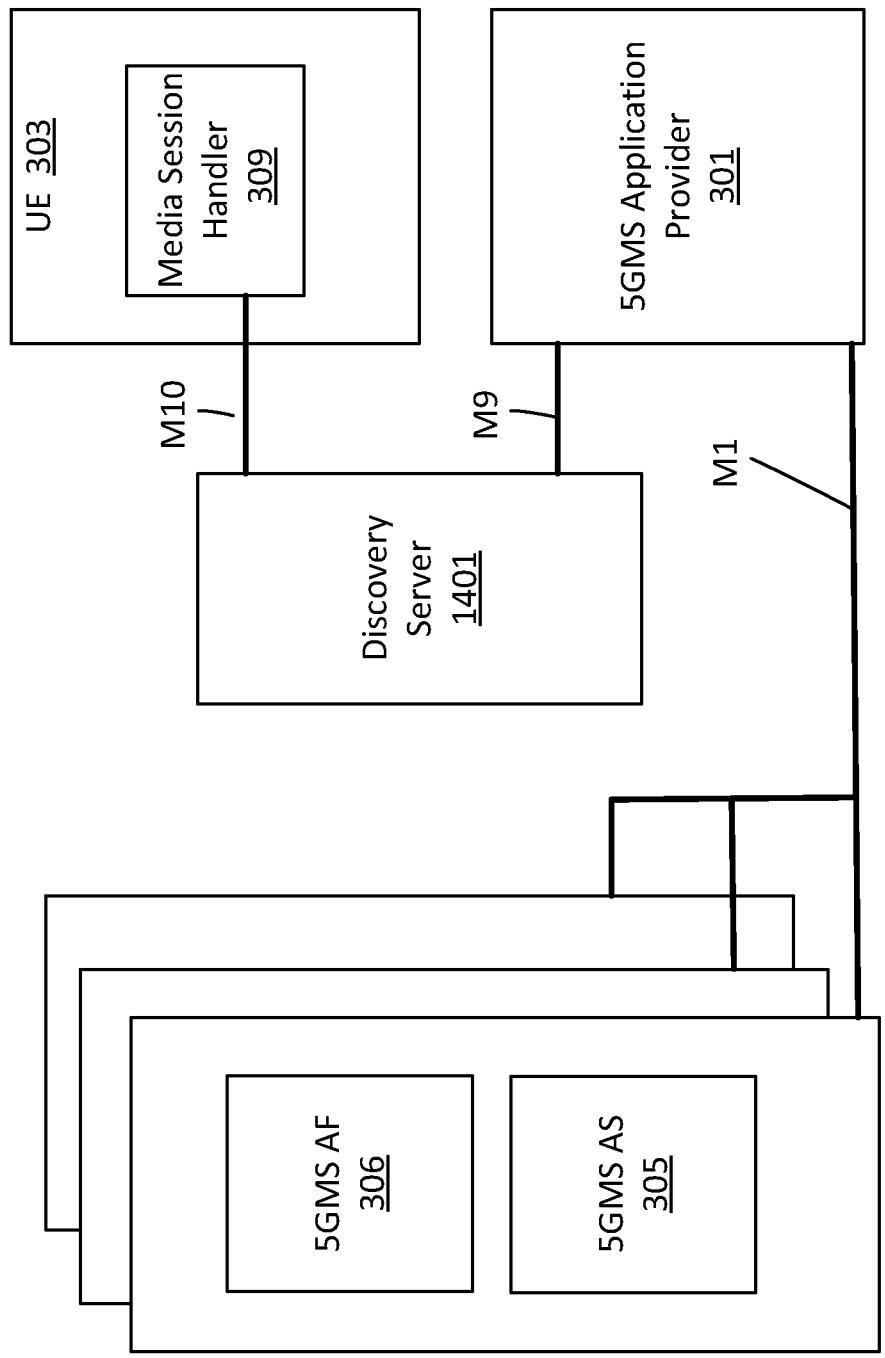
FIG. 14 is a block diagram of a network architecture for media streaming, according to embodiments.

FIG. 14 illustrates an architecture 1400 which includes some elements from architecture 300 of FIG. 3, along with an additional element, DS 1401. In order to avoid unnecessary duplication, redundant description has been omitted.

In FIG. 14, DS 1401 may be used for the discovery of available 5GMS ASs 305. as can be seen in FIG. 14, MSH 309 may communicate with discovery server 1401 using link M10, and 5GMS AP 301 may communicate with DS 1401 using link M9. The 5GMS AP 301 or an external application server may use the DS 1401 to obtain a list of 5GMS AS 305. Each entry in the DS 1401 may include some or all of the following information:

1. Name and description of 5GMS AS 305
2. URL of the corresponding 5GMS AF 306
3. The capabilities of the corresponding 5GMS AS 305

Figure 15:
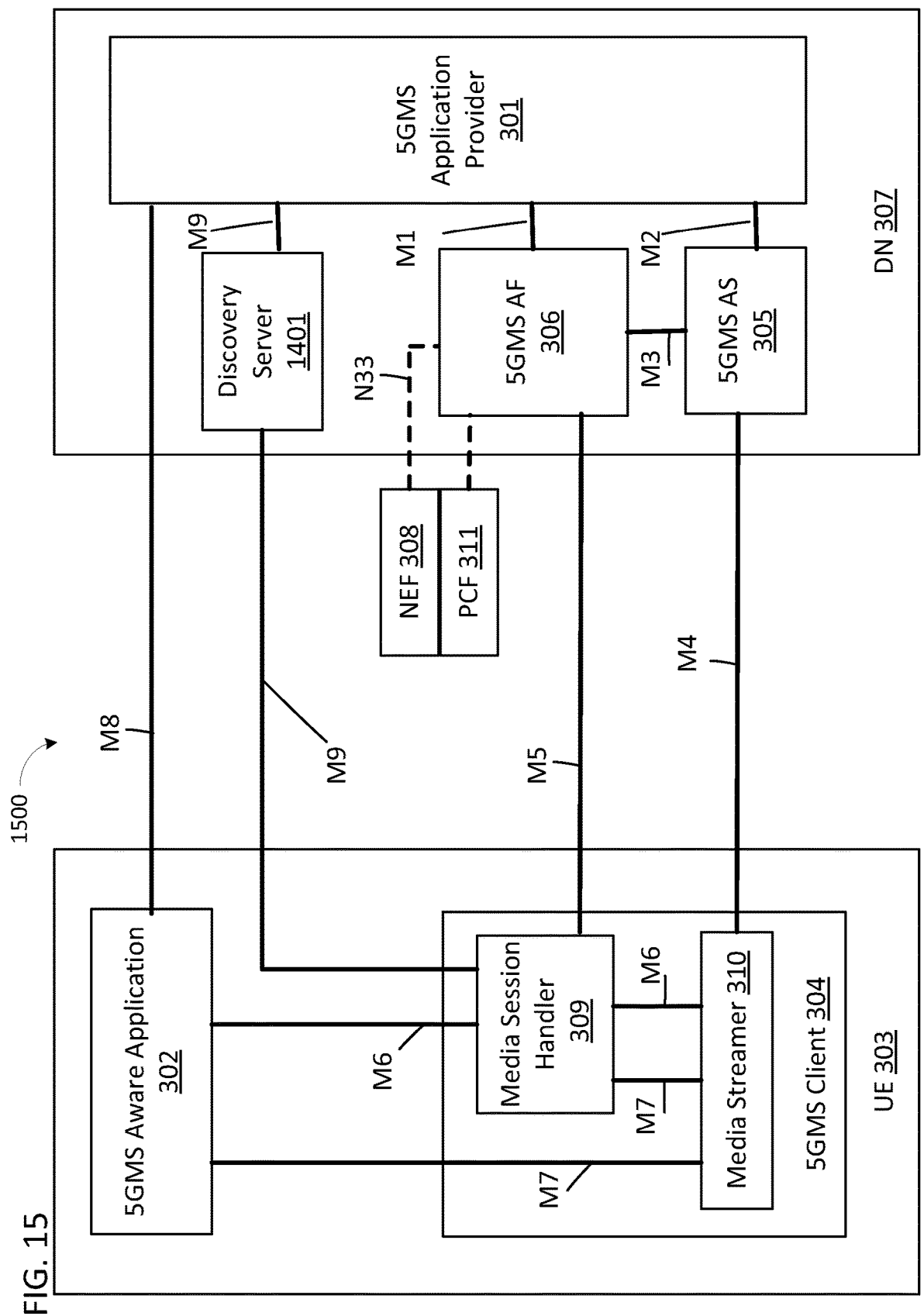
FIG. 15 is a block diagram of a network architecture for media streaming, according to embodiments.
Figure 16:
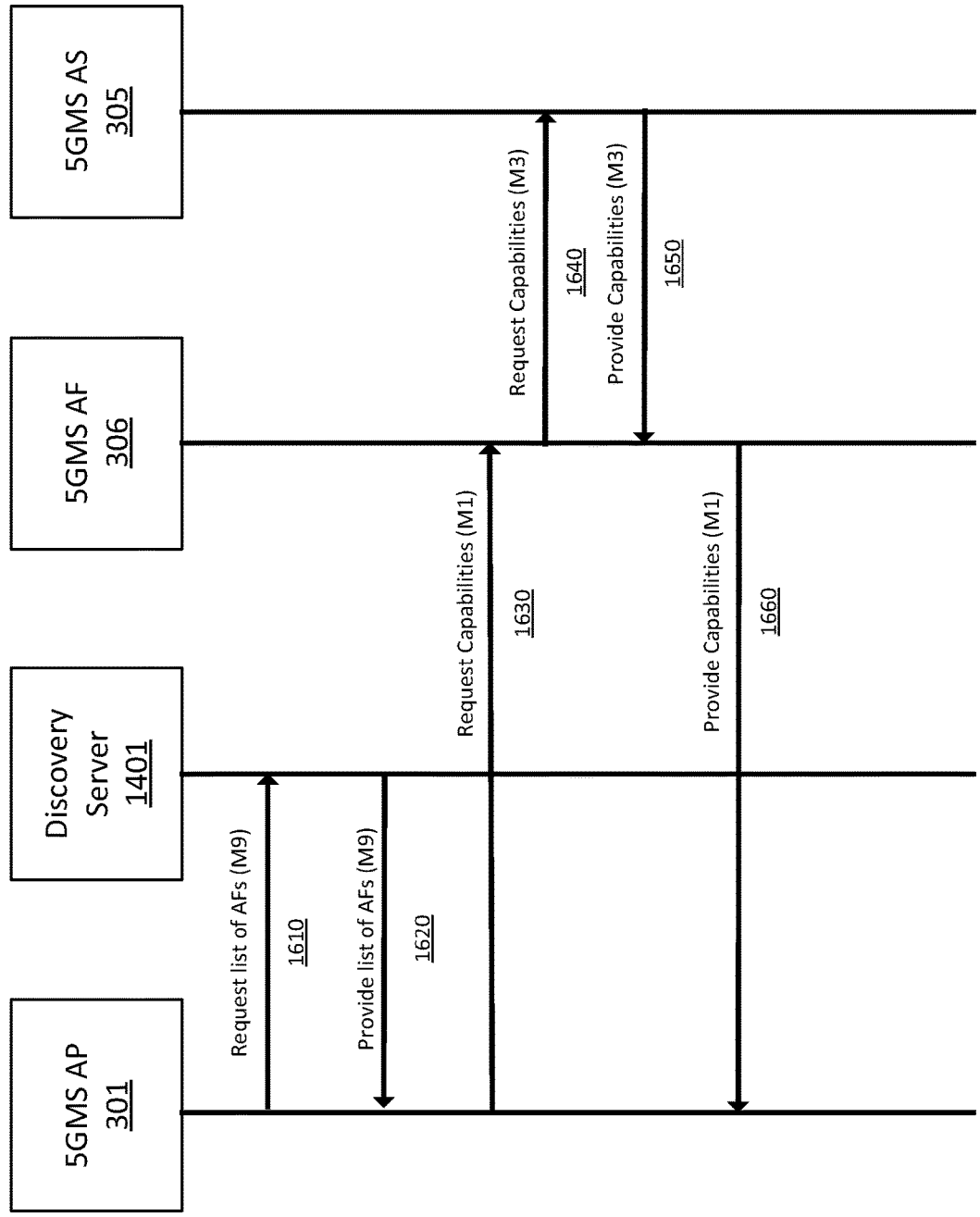
FIG. 16 is a block diagram illustrating an example process for network capability discovery, according to embodiments.
Figure 17:
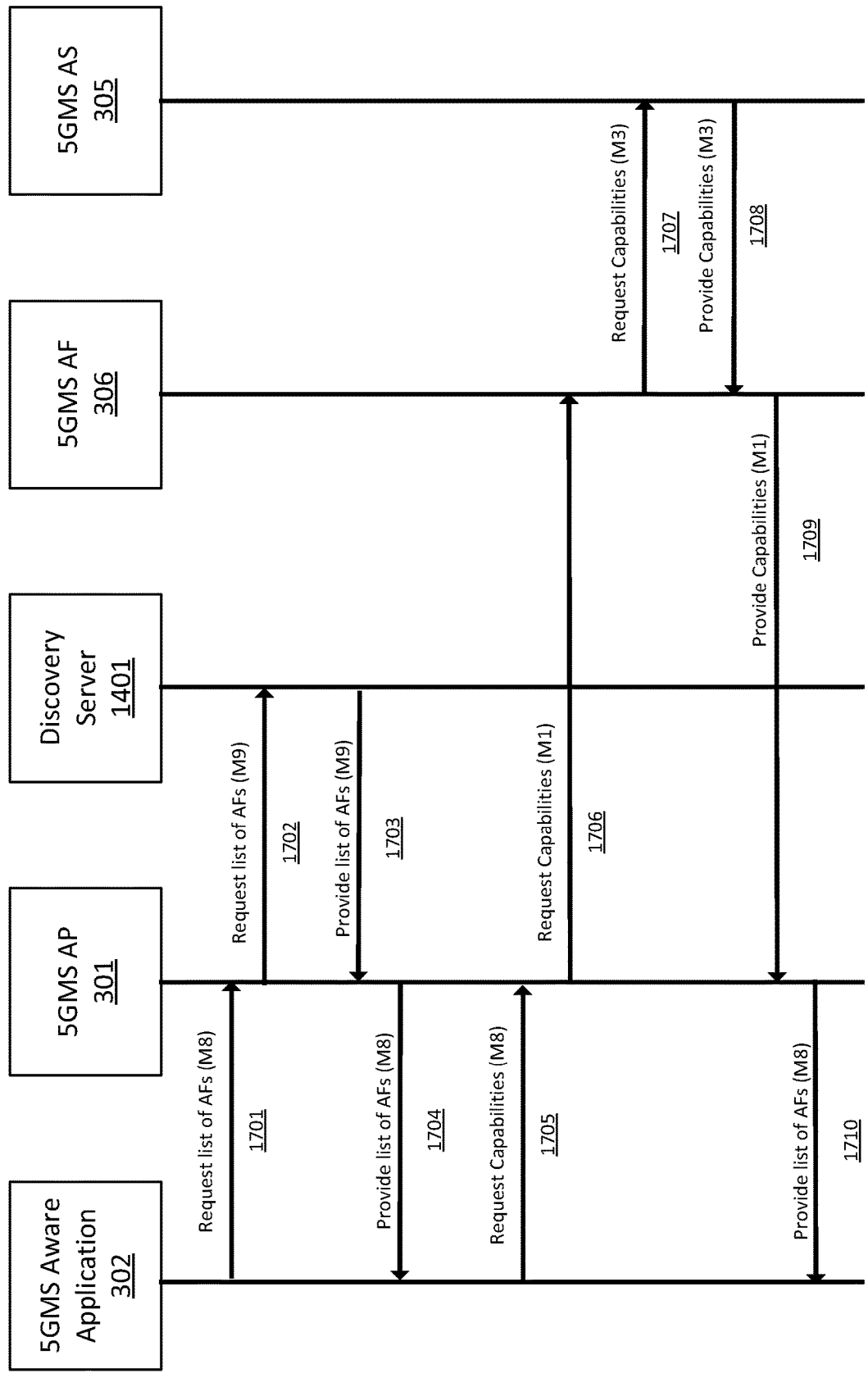
FIG. 17 is a block diagram illustrating an example process for network capability discovery, according to embodiments.
Figure 18:
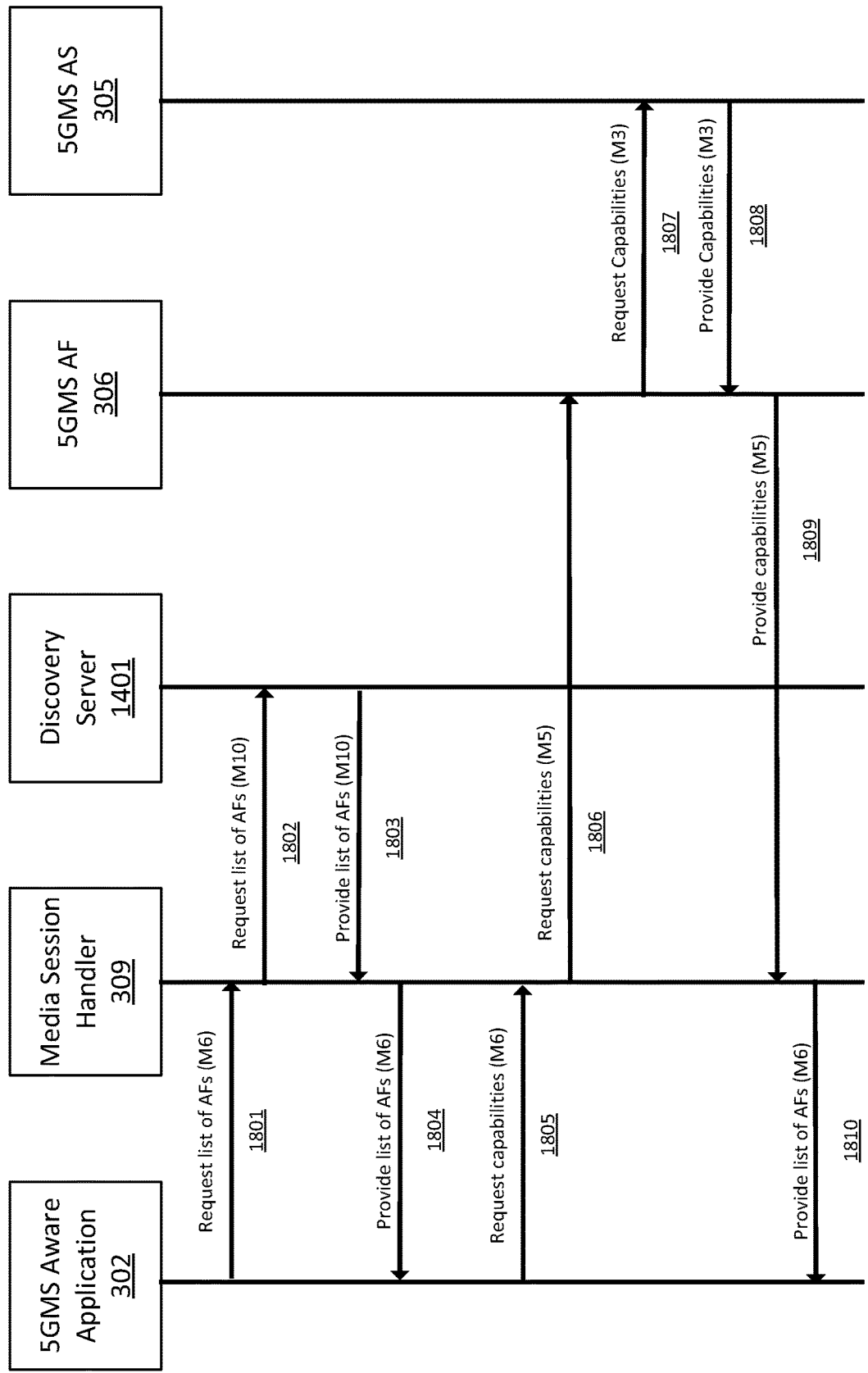
FIG. 18 is a block diagram illustrating an example process for network capability discovery, according to embodiments.

FIG. 15 illustrates an architecture 1500 which includes some elements from architecture 300 of FIG. 3, along with DS 1401. In order to avoid unnecessary duplication, redundant description has been omitted FIGS. 16-18 illustrates processes 1600, 1700, and 1800 which may relate to call flows for discovering network capabilities. Process 1600, 1700, and 1800 may be performed using architecture 1400, architecture 1500, or any other architecture as desired.

Processes 1600, 1700, and 1800 may extend the TS26.501 APIs to enable the discovery of 5G application servers.

Process 1600 relates to a call flow in which 5GMS AP 301 may discover network capabilities. According to process 1600, at operation 1610, 5GMS AP 301 may send a request for a list of AFs to DS 1401 using link M9. At operation 1620, DS 1401 may provide the list of available AFs to 5GMS AP 301 using link M9. At operation 1630, 5GMS AP 301 may send a request for capabilities to 5GMS AF 306 using link M1. At operation 1640, 5GMS AF 306 may send a request for capabilities to 5GMS AS 305 using link M3. At operation 1650, 5GMS AS 305 may send a response including the capabilities to 5GMS AF 306 using link M3. At operation 1660, 5GMS AF 306 may send a response including the capabilities to 5GMS AP 301 using link M1.

In embodiments, 5GMS Aware Application (AA) 302 included on the UE 303 may discover the network capabilities through 5GMS AP 301, as shown for example in process 1700 of FIG. 17, and through MSH 309, as shown for example in process 1800 of FIG. 18.

According to process 1700, at operation 1701, 5GMS AA 302 may send may send a request for a list of AFs to 5GMS AP 301 using link M8. At operation 1702, 5GMS AP 301 may send a request for a list of AFs to DS 1401 using link M9. At operation 1703, DS 1401 may provide the list of available AFs to 5GMS AP 301 using link M9. At operation 1704, 5GMS AP 301 may provide the list of available AFs to 5GMS AA 302 using link M8.

At operation 1705, 5GMS AA 302 may send a request for capabilities to 5GMS AP 301 using link M8. At operation 1706, 5GMS AP 301 may send a request for capabilities to 5GMS AF 306 using link M8. At operation 1707, 5GMS AF 306 may send a request for capabilities to 5GMS AS 305 using link M3. At operation 1708, 5GMS AS 305 may send a response including the capabilities to 5GMS AF 306 using link M3. At operation 1709, 5GMS AF 306 may send a response including the capabilities to 5GMS AP 301 using link M1. At operation 1710, 5GMS AP 301 may send a response including the capabilities to 5GMS AA 302 using link M8.

According to process 1800, at operation 1801, 5GMS AA 302 may send a request for a list of AFs to MSH 309 using link M6. At operation 1802, MSH 309 may send a request for a list of AFs to DS 1401 using link M10. At operation 1803, DS 1401 may provide the list of available AFs to MSH 309 using link M10. At operation 1804, MSH 309 may provide the list of available AFs to 5GMS AA 302 using link M6.

At operation 1805, 5GMS AA 302 may send a request for capabilities to MSH 309 using link M8. At operation 1806, MSH 309 may send a request for capabilities to 5GMS AF 306 using link M5. At operation 1806, 5GMS AF 306 may send a request for capabilities to 5GMS AS 305 using link M3. At operation 1808, 5GMS AS 305 may send a response including the capabilities to 5GMS AF 306 using link M3. At operation 1809, 5GMS AF 306 may send a response including the capabilities to MSH 309 using link M5. At operation 1810, MSH 309 may send a response including the capabilities to 5GMS AA 302 using link M6.

Table 7 shows information for entries in the DS 1401, according to embodiments:

TABLE 7

Discovery server information

| Information element | Status | Description |
| --- | --- | --- |
| URL | M | AF's URL |
| name | O | The name of Application Server |
| description | O | A description of the server |
| location | O | Location of the server |
| capabilities | O | Maximum capabilities of the Application Server |

M: Mandatory,
O: Optional

Table 8 shows information for application server capabilities, according to embodiments:

TABLE 8

Application Server capabilities

| Information element | Status | Description |
| --- | --- | --- |
| Maximum Request rate | O | Maximum request rate from the Application Client supported by the server. |
| Maximum Response time | O | The maximum response time advertised for the Application Client's service requests. |
| Availability | O | Advertised percentage of time the server is available for the Application Client's use. |
| Available Compute | O | The maximum compute resource available for the Application Client. |
| Available Graphical Compute | O | The maximum graphical compute resource available for the Application Client. |
| Available Memory | O | The maximum memory resource available for the Application Client. |

TABLE 8-continued

Application Server capabilities

| Information element | Status | Description |
|---|---|---|
| Available Storage | O | The maximum storage resource available for the Application Client. |
| Supported environment | O | The OS and architecture |
| Flow Control | O | Flow control capabilities |
| Repository | O | List and location of repositories |
| Functions | O | List of built-in functions and workflows, and their performance |

M: Mandatory,
O: Optional

Accordingly, embodiments may provide a method for discovering 5GMS AS 305 by the 5GMS AP 301 through a DS 1401 by which the URL of the 5GMS AF 306 and additional information, including capabilities of the corresponding application servers, may be listed.

Embodiments may provide a method for discovering the 5GMS AS 305 by 5GMS AA 302 through the 5GMS AS 305 by which the 5GMS AA 302 can discover the available the 5GMS ASs 305 and their capabilities.

Embodiments may provide a method for discovering the 5GMS AS 305 by 5GMS AA 302 through the MSH 309 by which the 5GMS AA 302 can discover the available 5GMS ASs 305 and their capabilities.

Embodiments may provide a method of conveying the application server and application function information in the DS 1401, wherein the URL and other information of 5GMS ASs 305 are listed in the DS 1401.

Embodiments may provide a method of discovering 5GMS AS 305 environment parameters, as well as built-in functions and supported repositories. wherein information about the 5GMS AS 305 operation system, environment parameters, and related information to run 1st and 3rd party applications, libraries, and functions on the 5GMS AS 305 can be discovered.

Embodiments corresponding to FIGS. 19-23 relate to various possible deployment scenarios to use the network and edge processing in 5GMS architecture. The use of NBMP standard as a specific case of network and edge processing is also addressed.

Figure 19:
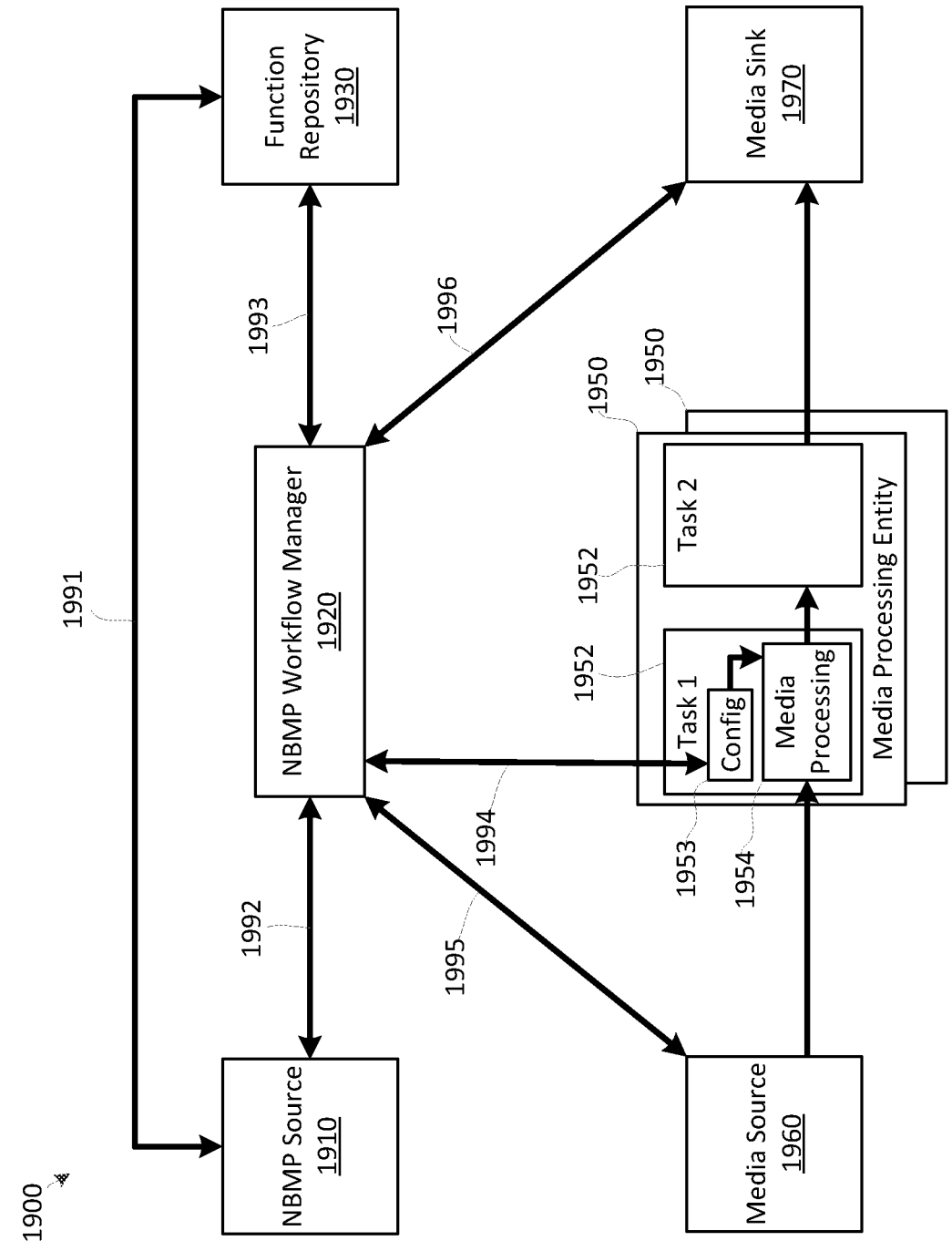
FIG. 19 is a block diagram of a network architecture for media streaming, according to embodiments.

With reference to FIG. 19, an NBMP system 1900 includes an NBMP source 1910, an NBMP workflow manager 1920, a function repository 1930, one or more media processing entities 1950, a media source 1960, and a media sink 1970.

The NBMP source 1910 may receive instructions from a third party entity, may communicate with the NBMP workflow manager 1920 via an NBMP workflow API 1992, and may communicate with the function repository 1930 via a function discovery API 1991. For example, the NBMP source 1910 may send a workflow description document(s) (WDD) to the NBMP workflow manager 1920, and may read the function description of functions stored in the function repository 1930, the functions being media processing functions stored in memory of the function repository 1930 such as, for example, functions of media decoding, feature point extraction, camera parameter extraction, projection method, seam information extraction, blending, post-processing, and encoding. The NBMP source 1910 may include or be implemented by at least one processor and memory that stores code configured to cause the at least processor to perform the functions of the NBMP source 1910.

The NBMP source 1910 may request the NBMP workflow manager 1920 to create workflow including tasks 1952 to be performed by the one or more media processing entities 1950 by sending the workflow description document, which may include several descriptors, each of which may have several parameters.

For example, the NBMP source 1910 may select functions stored in the function repository 1930 and send the workflow description document to the NBMP workflow manager 1920 that includes a variety of descriptors for description details such as input and output data, required functions, and requirements for the workflow. The workflow description document may include a set of task descriptions and a connection map of inputs and outputs of tasks 1952 to be performed by one or more of the media processing entities 1950. When the NBMP workflow manager 1920 receives such information from the NBMP source 1910, the NBMP workflow manager 1920 may create the workflow by instantiating the tasks based on function names and connecting the tasks in accordance with the connection map.

Alternatively or additionally, the NBMP source 1910 may request the NBMP workflow manager 1920 to create workflow by using a set of keywords. For example, NBMP source 1910 may send the NBMP workflow manager 1920 the workflow description document that may include a set of keywords that the NBMP workflow manager 1920 may use to find appropriate functions stored in the function repository 1930. When the NBMP workflow manager 1920 receives such information from the NBMP source 1910, the NBMP workflow manager 1920 may create the workflow by searching for appropriate functions using the keywords that may be specified in a Processing Descriptor of the workflow description document, and use the other descriptors in the workflow description document to provision tasks and connect them to create the workflow.

The NBMP workflow manager 1920 may communicate with the function repository 1930 via a function discovery API 1993, which may be a same or different API from the function discovery API 1991, and may communicate with one or more of the media processing entities 1950 via an API 1994 (e.g. an NBMP task API). The NBMP workflow manager 1920 may include or be implemented by at least one processor and memory that stores code configured to cause the at least processor to perform the functions of the NBMP workflow manager 1920.

The NBMP workflow manager 1920 may use the API 1994 to setup, configure, manage, and monitor one or more tasks 1952 of a workflow that is performable by the one or more media processing entities 1950. In an embodiment, the NBMP workflow manager 1920 may use the API 1994 to update and destroy the tasks 1952. In order to configure, manage, and monitor tasks 1952 of the workflow, the NBMP workflow manager 1920 may send messages, such as requests, to one or more of the media processing entities 1950, wherein each message may have several descriptors, each of which have several parameters. The tasks 1952 may each include media processing functions 1954 and configurations 1953 for the media processing functions 1954.

In an embodiment, after receiving a workflow description document from the NBMP source 1910 that does not include a list of the tasks (e.g. includes a list of keywords instead of a list of tasks), the NBMP workflow manager 1920 may select the tasks based on the descriptions of the tasks in the workflow description document to search the function repository 1930, via the function discovery API 1993, to find the appropriate functions to run as tasks 1952 for a current workflow. For example, the NBMP workflow manager 1920 may select the tasks based on keywords provided in the workflow description document. After the appropriate functions are identified by using the keywords or the set of task descriptions that is provided by the NBMP source 1910, the NBMP workflow manager 1920 may configure the selected tasks in the workflow by using the API 1994. For example, the NBMP workflow manager 1920 may extract configuration data from information received from the NBMP source, and configure the tasks 1952 based on the configuration data.

The one or more media processing entities 1950 may be configured to receive media content from the media source 1960, process the media content in accordance with the workflow, that includes tasks 1952, created by the NBMP workflow manager 1920, and output the processed media content to the media sink 1970. The one or more media processing entities 1950 may each include or be implemented by at least one processor and memory that stores code configured to cause the at least processor to perform the functions of the media processing entities 1950.

The media source 1960 may include memory that stores media and may be integrated with or separate from the NBMP source 1910. In an embodiment, the NBMP workflow manager 1920 may notify the NBMP source 1910 when a workflow is prepared and the media source 1960 may transmit media content to the one or more of the media processing entities 1950 based on the notification that the workflow is prepared.

The media sink 1970 may include or be implemented by at least one processor and at least one display that is configured to display the media that is processed by the one or more media processing entities 1950.

As discussed above, messages from the NBMP Source 1910 (e.g. a workflow description document for requesting creation of a workflow) to the NBMP workflow manager 1920, and messages (e.g. for causing the workflow to be performed) from the NBMP workflow manager 1920 to the one or more media processing entities 1950 may include several descriptors, each of which may have several parameters. In cases, communication between any of the components of the NBMP system 1900 using an API may include several descriptors, each of which may have several parameters.

FIGS. 20-23 illustrate architectures 2000, 2100, 2200, and 2300 elements from architecture 300 of FIG. 3 are combined with elements from system 1900, and additional elements are added. In order to avoid unnecessary duplication, redundant description has been omitted.

Figure 20:
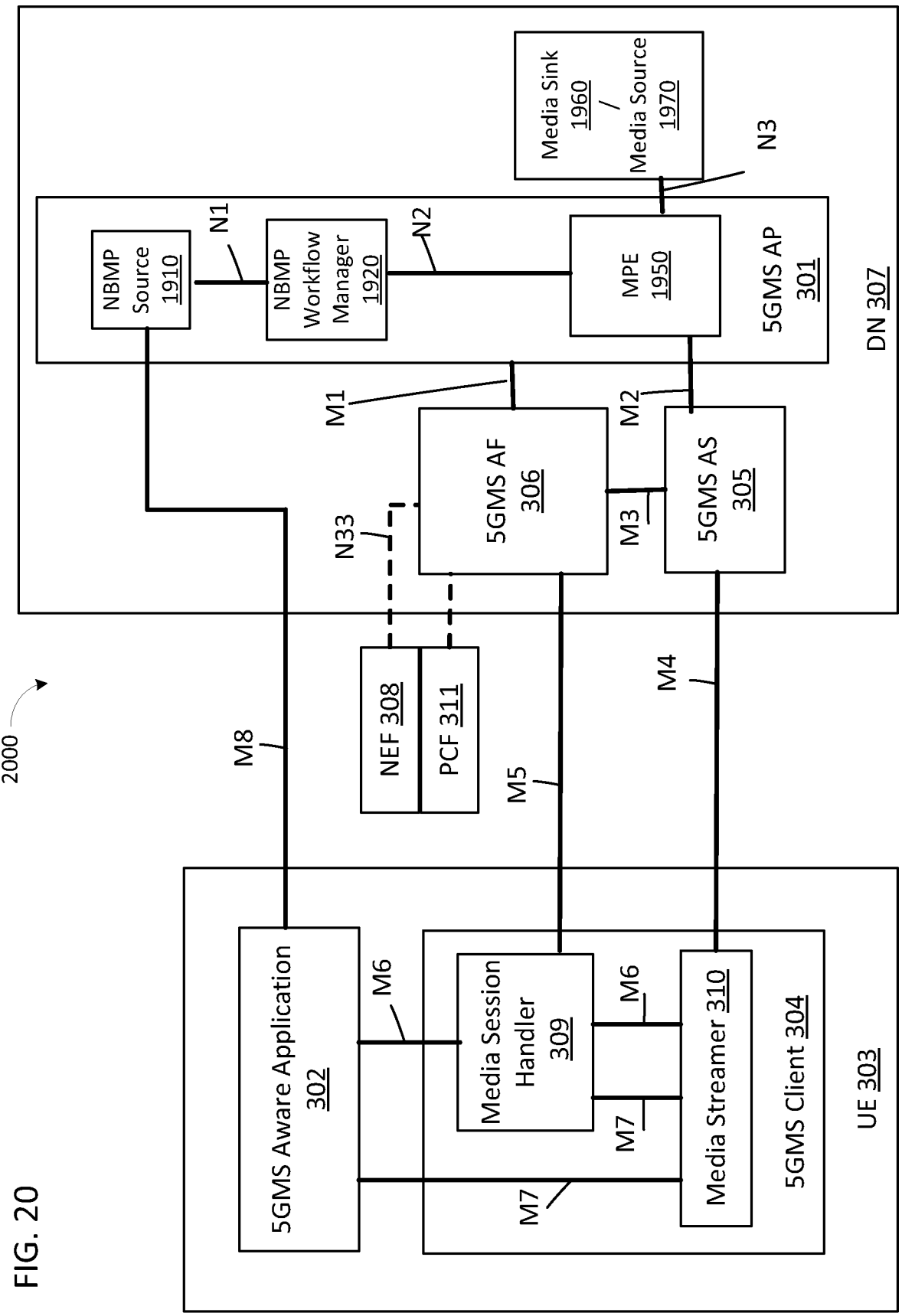
FIG. 20 is a block diagram of a network architecture for media streaming, according to embodiments.

FIG. 20 illustrates architecture 2000, in which network processing is included in the application server. As can be seen in FIG. 20, NMBP source 1910, NBMP workflow manager 1920, and one or more media processing entities (MPE) 1950 are located in the 5GMS AP 301.

A process for establishing, operation, and tearing down a session may include:
1. 5GMS AA 302 makes a request through M8 to NMBP source 1910.
2. NMBP source 1910 builds the Workflow Description (WD) and requests the NMBP source 1910 to instantiate the Workflow.
3. NMBP workflow manager 1920 discovers various MPEs 1950 and finds enough number of MPEs 1950 to run the workflow
4. NMBP workflow manager 1920 instantiates the workflow.
5. NMBP workflow manager 1920 responds to NMBP source 1910 with updated WD.
6. NMBP source 1910 responds to 5GMS AA 302 with 5GMS AF 306 and 5GMS AS 305 information.
7. 5GMS AA 302 requests MSH 309 to establish the session.
8. MSH 309 establishes the session and acknowledges 5GMS AA 302.
9. 5GMS AA 302 start ingesting the content.
10. The session runs.
11. 5GMS AA 302 requests NMBP source 1910 to end the session.
12. NMBP source 1910 request NMBP workflow manager 1920 to end the Workflow.
13. NMBP workflow manager 1920 acknowledges the stopping of the Workflow.
14. NMBP source 1910 acknowledges 5GMS AA 302 the stopping of the workflow.
15. 5GMS AA 302 requests MSH 309 to stop the session.

Table 9 shows the required standard interfaces in this scenario:

TABLE 9

| Required Standard APIs for entire Workflow Processing in Application Server | | |
|---|---|---|
| Standard | 5GMS Workflow Processing | M1, M2, M4, M5 N3 |

Figure 21:
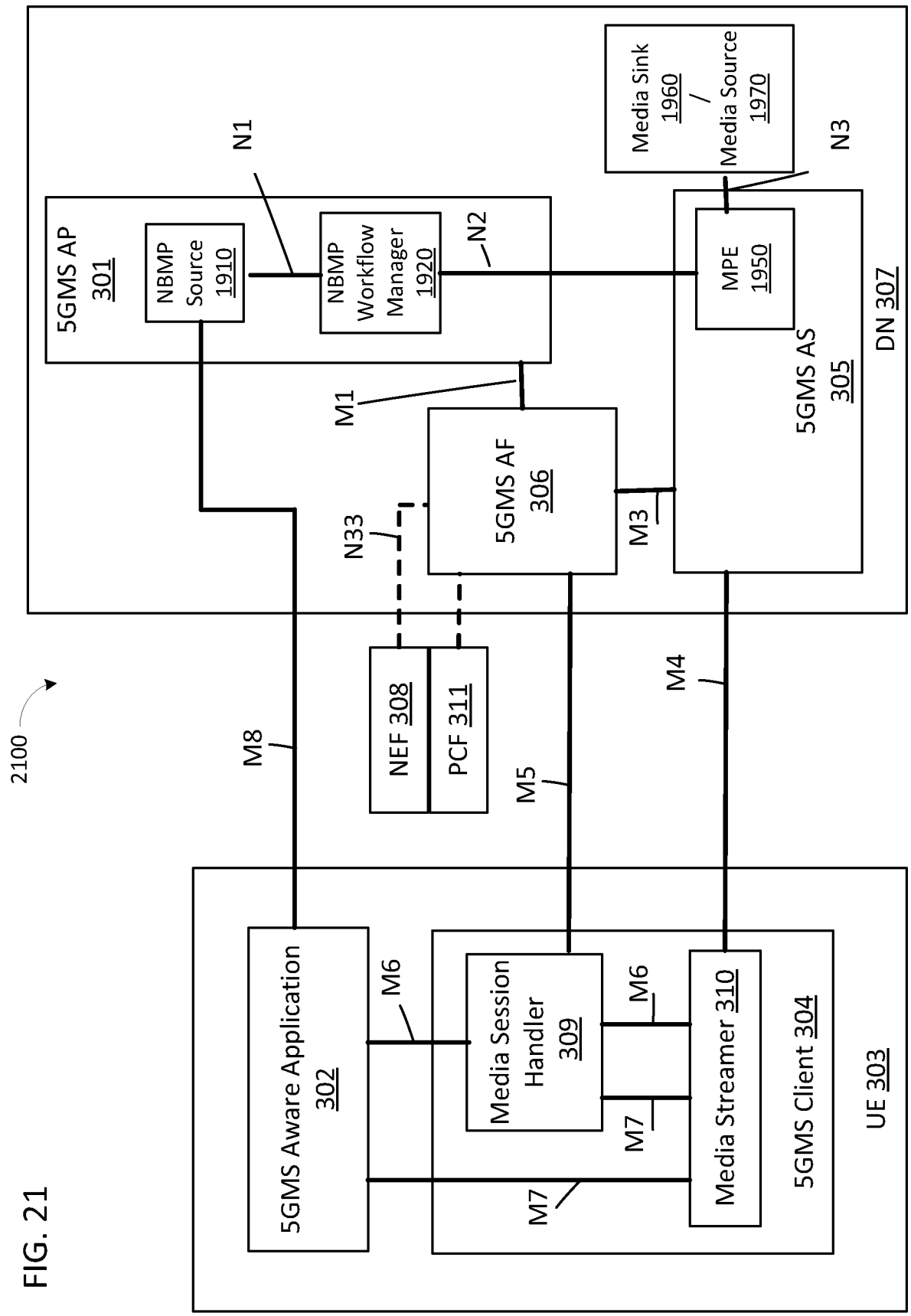
FIG. 21 is a block diagram of a network architecture for media streaming, according to embodiments.

FIG. 21 illustrates architecture 2100, in which NMBP source 1910 and NMBP workflow manager 1920 are included in 5GMS AP 301. As can be seen in FIG. 21, NMBP source 1910 and NMBP workflow manager 1920 are located in the 5GMS AP 301, and MPEs 1950 are located in 5GMS AS 305.

A process for establishing, operation, and tearing down a session may include:
1. 5GMS AA 302 makes a request through M8 to Workflow Source (NMBP source 1910).
2. NMBP source 1910 builds the Workflow Description (WD) and requests the NMBP workflow manager 1920 to instantiate the Workflow.
3. NMBP workflow manager 1920 discovers 5GMS AS 305 with enough number of MPEs 1950 to run the workflow
4. NMBP workflow manager 1920 instantiates the workflow through 5GMS AS 305.
5. NMBP workflow manager 1920 responds to NMBP source 1910 with updated WD.
6. NMBP source 1910 responds to 5GMS AA 302 with 5GMS AF 306 and 5GMS AS 305 information.
7. 5GMS AA 302 requests MSH 309 to establish the session.
8. MSH 309 establishes the session and acknowledges 5GMS AA 302.
9. 5GMS AA 302 start ingesting the content.
10. The session runs.
11. 5GMS AA 302 requests NMBP source 1910 to end the session.
12. NMBP source 1910 request NMBP workflow manager 1920 to end the Workflow.
13. NMBP workflow manager 1920 request 5GMS AS 305 to stop MPEs 1950.
14. NMBP workflow manager 1920 acknowledges the stopping of the Workflow.

15. NMBP source 1910 acknowledges 5GMS AA 302 the stopping of the workflow.
16. 5GMS AA 302 requests MSH 309 to stop the session.

Table 10 shows the required standard interfaces in this scenario:

TABLE 10

| Required Standard APIs when MPE 1950 in 5GMS AS 305 | | |
|---|---|---|
| Standard | FLUS | M1, M4, M5 |
|  | Workflow Processing | N2, N3 |

Note that N2 may be a closed API implemented by the AP-operator agreement.

Figure 22:
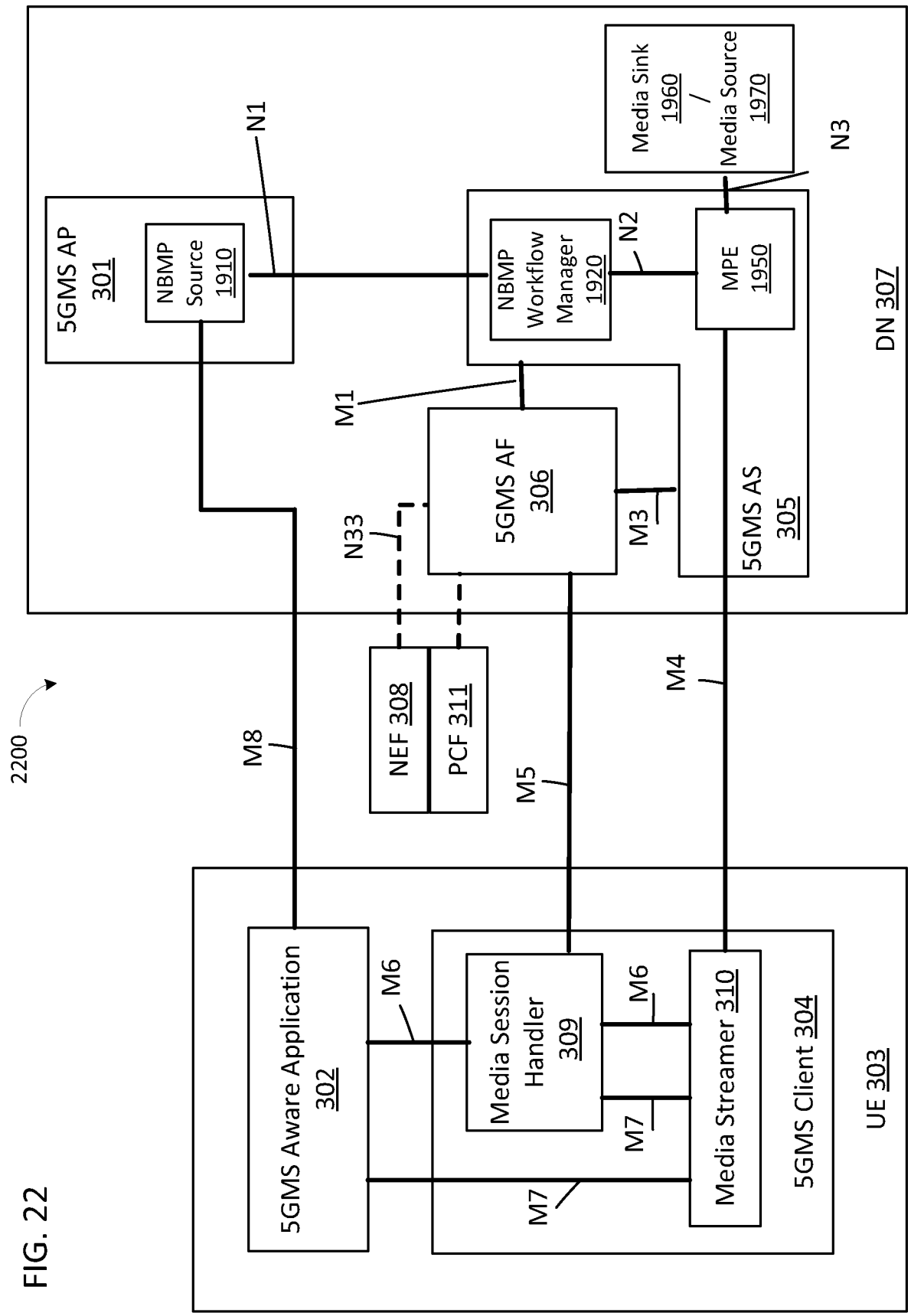
FIG. 22 is a block diagram of a network architecture for media streaming, according to embodiments.

FIG. 22 illustrates architecture 2200, in which NMBP workflow manager 1920 and MPE 1950 are included in 5GMS AS 305

1. 5GMS AA 302 makes a request through M8 to Workflow Source (NMBP source 1910).
2. NMBP source 1910 builds the Workflow Description (WD) and discovers 5GMS AS 305 which can perform the media.
3. NMBP source 1910 requests the appropriate 5GMS ASs 305 NMBP workflow manager 1920 to instantiate the Workflow.
4. NMBP workflow manager 1920 instantiates the workflow inside 5GMS AS 305.
5. NMBP workflow manager 1920 responds to NMBP source 1910 with updated WD.
6. NMBP source 1910 responds to 5GMS AA 302 with 5GMS AF 306 and 5GMS AS 305 information.
7. 5GMS AA 302 requests MSH 309 to establish the session.
8. MSH 309 establishes the session and acknowledges 5GMS AA 302.
9. 5GMS AA 302 start ingesting the content.
10. The session runs
11. 5GMS AA 302 requests NMBP source 1910 to end the session.
12. NMBP source 1910 request NMBP workflow manager 1920 of 5GMS AS 305 to end the Workflow.
13. NMBP workflow manager 1920 acknowledges the stopping of the Workflow.
14. NMBP source 1910 acknowledges 5GMS AA 302 the stopping of the workflow.
15. 5GMS AA 302 requests MSH 309 to stop the session.

Table 11 shows the required standard interfaces in this scenario:

TABLE 11

| NMBP workflow manager 1920 and MPE 1950 in 5GMS AS 305 | | |
|---|---|---|
| Standard | FLUS | M1, M4, M5 |
|  | Workflow | N1, N3 |

Figure 23:
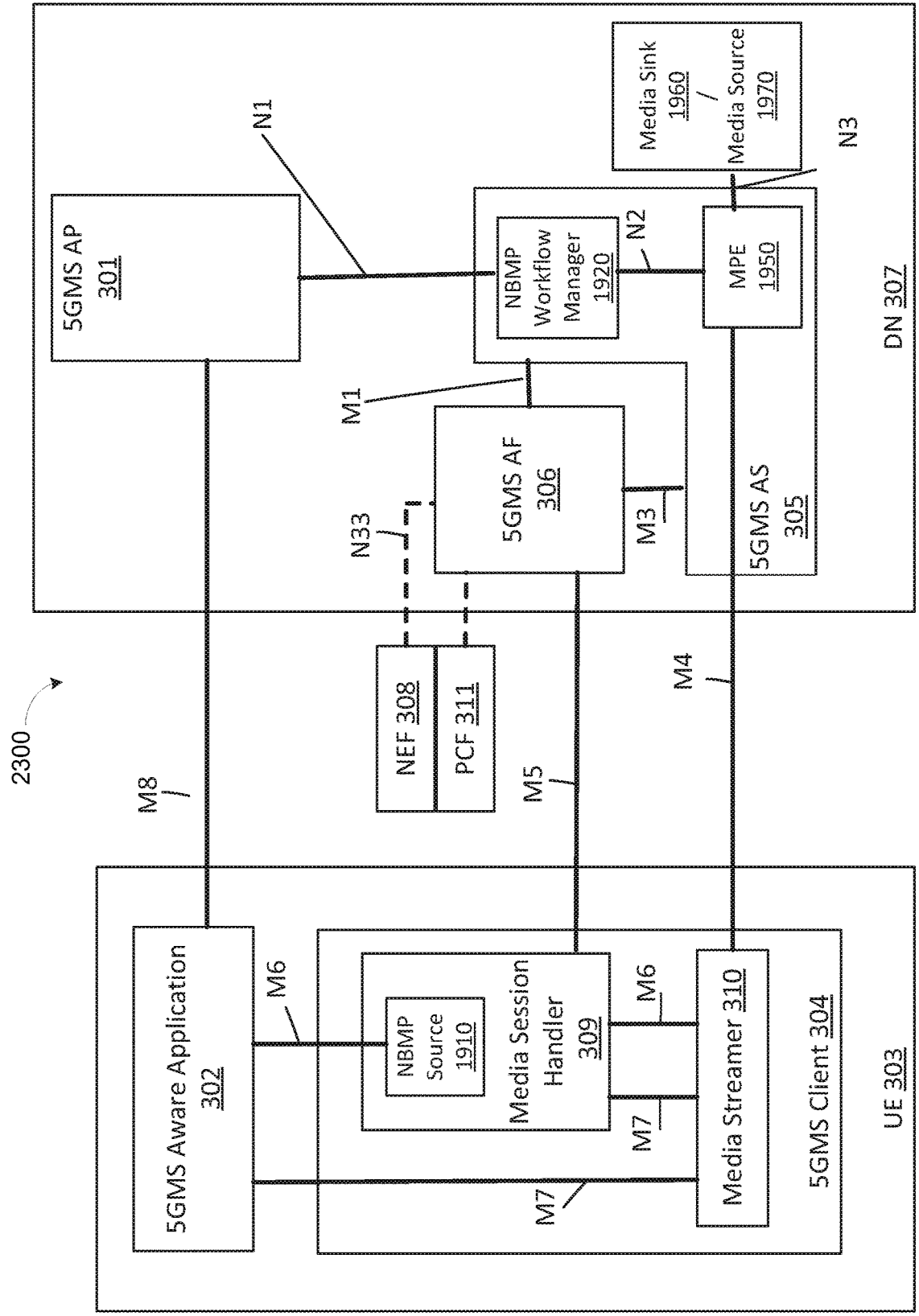
FIG. 23 is a block diagram of a network architecture for media streaming, according to embodiments.

FIG. 23 illustrates architecture 2300, in which NMBP source 1910 is included in MSH 309, and NMBP workflow manager 1920 and MPE 1950 are included in in 5GMS AS 305.

A process for establishing, operation, and tearing down a session may include:
1. 5GMS AA 302 requests MSH 309 through M6 to start a session 2. NMBP source 1910 builds the Workflow Description (WD) and discovers 5GMS AS 305 which can perform the media through M5 or other means.
3. MSH 309's NMBP source 1910 requests the NMBP workflow manager 1920 of the appropriate 5GMS AS 305 to instantiate the Workflow.
4. NMBP workflow manager 1920 instantiates the workflow inside 5GMS AS 305.
5. NMBP workflow manager 1920 responds to MSH 309 with updated WD.
6. MSH 309 responds to 5GMS AA 302.
7. 5GMS AA 302 requests MSH 309 to establish the session.
8. MSH 309 establishes the session and acknowledges 5GMS AA 302.
9. 5GMS AA 302 start ingesting the content.
10. The session runs.
11. 5GMS AA 302 requests MSH 309 to end the session.
12. MSH 309's NMBP source 1910 request NMBP workflow manager 1920 of 5GMS AS 305 to end the Workflow.
13. NMBP workflow manager 1920 acknowledges the stopping of the Workflow.
14. MSH 309 acknowledges 5GMS AA 302 the stopping of the workflow.

Table 12 shows the required standard interfaces in this scenario:

TABLE 12

| Workflow Source in MSH 309, NMBP workflow manager 1920, and MPE 1950 in 5GMS AS 305 | | |
|---|---|---|
| Standard | FLUS | M1, M4, M5 |
|  | Workflow | N4 |

Note that M5 is with the support of Workflow Manager APIs.

Table 13 shows a summary of deployment scenarios.

TABLE 13

| Summary of the deployment scenarios | | |
|---|---|---|
| Scenario | Standard | API |
| All Workflow module in Application Server | 5GMS Workflow Processing | M1, M2, M4, M5 N3 |
| MPE 1950 in 5GMS AS 305 | FLUS Workflow Processing | M1, M4, M5 N2, N3 |
| NMBP workflow manager 1920 and MPE 1950 in 5GMS AS 305 | FLUS Workflow Processing | M1, M4, M5 N1, N3 |
| NMBP source 1910 in MSH 309, and both NMBP workflow manager 1920 and MPE 1950 in 5GMS AS 305 | FLUS Workflow | M1, M4, M5 N3 |

Note that N2 may be a closed API implemented by the AP-operator agreement. Also, note that M5 is with the support of NBMP Workflow Manager APIs.

It is possible to deploy other variations of the above scenarios. For instance, the NMBP workflow manager 1920 and MPE 1950 can be supported in 5GMS AS 305 with the NMBP source 1910 is supported in 5GMS AA 302, or all NMBP source 1910, NMBP workflow manager 1920 and MPE 1950 are supported in 5GMS AS 305.

In the 5GMS general architecture (5GMSA), more than one 5GMS AF 306 and 5GMS AS 305 pair may exist. In those cases, NMBP source 1910 and/or NMBP workflow manager 1920 must discover the capabilities of multiple 5GMS AF 306 and 5GMS AS 305 pairs for running the network media workflow on the most suitable 5GMS AS 305.

Accordingly, embodiments may provide a method for deployment of any network or edge-based media processing such as NBMP workflow management in 5GSMA environment wherein 4 different scenarios is considered, including implementing a) Entire network processing modules in Application Server, b) media processing services in 5GMS AS 305 c) workflow manager and media processing services in 5GMS AS 305, and d) NBMP source 1910 in MSH 309, and both NBMP workflow manager 1920 and MPE 1950 are in 5GMS AS 305. In each scenario the workflow processing modules may be implemented in a different module of the 5GSM architecture, wherein for each scenario the APIs between network processing and 5GMSA are defined, where APIs are divided to the APIs according to the 3GPP 3GSMA standards, the internal APIs for each module and the private APIs between the service provider and the operator.

Embodiments may provide methods including separate call flow for the establishment, management, and tears down of Workflow processing and 5GMSA joint session for each of the four scenarios of method 1, wherein each case's call flow, a workflow session, and a FLUS session are set up, where appropriate information is exchanged through the APIs defined in method 1 to establish and manage a joint session where the content is up-streamed from the device to the network using 5GMSA and then it is processed in a cloud or edge service using the network workflow processing.

Embodiments may provide methods for implementing the NBMP standard as the network workflow processing, for deployment with 5GMSA.

FIG. 24 is a flowchart is an example process 2400 for managing capabilities of a media streaming network. In some implementations, one or more process blocks of FIG. 2400 may be performed by one or more elements of any of the systems or architectures discussed above.

As shown in FIG. 24, process 2400 may include receiving a capability request for media streaming capabilities of an edge data network (EDN) (block 2402). In embodiments, the EDN may correspond to EDN 401 discussed above.

As further shown in FIG. 24, process 2400 may include determining the media streaming capabilities of the EDN (block 2404).

As further shown in FIG. 24, process 2400 may include transmitting a capability response based on the determined media streaming capabilities (block 2406).

As further shown in FIG. 24, process 2400 may include receiving a media processing workflow request based on the capability response (block 2408).

As further shown in FIG. 24, process 2400 may include establishing a media streaming session according to the media processing workflow request (block 2410).

As further shown in FIG. 24, process 2400 may include streaming media content based on the media streaming session (block 2412).

In embodiments, the media streaming capabilities relate to at least one of available hardware resources, environmental characteristics of the EDN, a current throughput of an edge server associated with the EDN, an current delay range of the edge server, available media processing function libraries, functional descriptions of one or more functions, and characteristics of the one or more functions.

In embodiments, the receiving of the capability request may include receiving, by an edge application server (EAS), a first capability request from a media streaming handler of a client device, and the determining of the media streaming capabilities may include transmitting, by the EAS, a second capability request to at least one of a media streaming application function or a media streaming application server included in the EAS. In embodiments, the EAS may correspond to EAS 402 discussed above.

In embodiments, the first capability request may be transmitted using an edge application programming interface (API), and the second capability request is transmitted using a media streaming API.

In embodiments, the capability request may be received by an edge configuration server (ECS) from a media streaming application provider (AP). In embodiments, the AP may correspond to 5GMS AP 301 discussed above, and the ECS may correspond to ECS 404 discussed above.

In embodiments, the determining of the media streaming capabilities may include transmitting, from the ECS to the AP, a list of a plurality of edge enabler servers (EES); receiving, by the ECS from the AP, a registration request for an EES from among the plurality of EESs; and transmitting, from the EES to the AP, a list of a plurality of EASs including the media streaming capabilities. In embodiments, the EES may correspond to EES 403 discussed above.

In embodiments, the media processing workflow request may be transmitted from the AP to an EAS from among the plurality of EASs based on the list of the plurality of EASs.

In embodiments, the list of the plurality of EASs may be transmitted to the AP through an edge discovery function (EDF). In embodiments, the EDG may correspond to EDF 1101 discussed above.

In embodiments, the EDF may be included in the AP.

Although FIG. 24 shows example blocks of process 2400, in some implementations, process 2400 may include additional blocks, fewer blocks, different blocks, or differently arranged blocks than those depicted in FIG. 24. Additionally, or alternatively, two or more of the blocks of process 2400 may be performed in parallel.

Further, the example methods according to embodiments of the instant application may be implemented by processing circuitry (e.g., one or more processors or one or more integrated circuits). In one example, the one or more processors execute a program that is stored in a non-transitory computer-readable medium to perform one or more of the example methods.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of managing capabilities of a media streaming network using at least one processor, the method comprising:
   receiving a capability request for media streaming capabilities of an edge data network (EDN);
   determining the media streaming capabilities of the EDN;
   transmitting a capability response based on the determined media streaming capabilities;
   receiving a media processing workflow request based on the capability response;
   establishing a media streaming session according to the media processing workflow request; and
   streaming media content based on the media streaming session,
   wherein the capability request is received by a 5G media streaming (MS) application function (AF) and from a media streaming application provider (AP),
   wherein a confirmation, based on a list of a plurality of edge application servers (EASs) and any of environmental characteristics, a throughput and delay range, media processing function libraries, and input/output formats of functions, is transmitted from the 5GMS AF and to the AP through an edge discovery function (EDF) included in the AP,
   wherein a first capability request and a second capability request are transmitted by different application programming interfaces (APIs), and
   wherein the capability request is one of the first capability request and the second capability request.

2. The method of claim 1, wherein the media streaming capabilities relate to at least one of media content transcoding, content protection, advertisement insertion, closed captioning, available hardware resources, environmental characteristics of the EDN, a current throughput of an edge server associated with the EDN, and a current delay range of the edge server.

3. The method of claim 1, wherein the receiving of the capability request comprises receiving, by an edge application server (EAS), the first capability request from a media streaming handler of a client device.

4. The method of claim 3, wherein the determining of the media streaming capabilities comprises transmitting, by the EAS, the second capability request to at least one of a media streaming application function or a media streaming application server included in the EAS.

5. The method of claim 1, wherein the capability request is received by an edge configuration server (ECS).

6. The method of claim 5, wherein the determining of the media streaming capabilities comprises:
   transmitting, from the ECS to the AP, a list of a plurality of edge enabler servers (EES);
   receiving, by the ECS from the AP, a registration request for an EES from among the plurality of EESs; and
   transmitting, from the EES to the AP, a list of a plurality of edge application servers (EAS) including the media streaming capabilities.

7. The method of claim 6, wherein the media processing workflow request is transmitted from the AP to an EAS from among the plurality of EASs based on the list of the plurality of EASs.

8. The method of claim 1, wherein the first capability request is transmitted using an edge API.

9. The method of claim 8, wherein the second capability request is transmitted using a media streaming API.

10. A device for managing capabilities of a media streaming network, the device comprising:
    at least one memory configured to store program code; and
    at least one processor configured to read the program code and operate as instructed by the program code, the program code including:
      first receiving code configured to cause the at least one processor to receive a capability request for media streaming capabilities of an edge data network (EDN);
      determining code configured to cause the at least one processor to determine the media streaming capabilities of the EDN;
      first transmitting code configured to cause the at least one processor to transmit a capability response based on the determined media streaming capabilities;
      second receiving code configured to cause the at least one processor to receive a media processing workflow request based on the capability response;
      establishing code configured to cause the at least one processor to establish a media streaming session according to the media processing workflow request;
      streaming code configured to cause the at least one processor to stream media content based on the media streaming session,
    wherein the capability request is received by a 5G media streaming (MS) application function (AF) and from a media streaming application provider (AP),
    wherein a confirmation, based on a list of a plurality of edge application servers (EASs) and any of environmental characteristics, a throughput and delay range, media processing function libraries, and input/output formats of functions, is transmitted from the 5GMS AF and to the AP through an edge discovery function (EDF) included in the AP,
    wherein a first capability request and a second capability request are transmitted by different application programming interfaces (APIs), and
    wherein the capability request is one of the first capability request and the second capability request.

11. The device of claim 10, wherein the media streaming capabilities relate to at least one of media content transcoding, content protection, advertisement insertion, closed captioning, available hardware resources, environmental characteristics of the EDN, a current throughput of an edge server associated with the EDN, and a current delay range of the edge server.

12. The device of claim 10, wherein the first receiving code further comprises third receiving code configured to cause the at least one processor to receive, by an edge application server (EAS), the first capability request from a media streaming handler of a client device.

13. The device of claim 12, wherein the determining code further comprises second transmitting code configured to cause the at least one processor to transmit, by the EAS, the second capability request to at least one of a media streaming application function or a media streaming application server included in the EAS.

14. The device of claim 10, wherein the capability request is received by an edge configuration server (ECS).

15. The device of claim 14, wherein the determining of the media streaming capabilities comprises:
    second transmitting code configured to cause the at least one processor to transmit, from the ECS to the AP, a list of a plurality of edge enabler servers (EES);
    fourth receiving code configured to cause the at least one processor to receive, by the ECS from the AP, a registration request for an EES from among the plurality of EESs; and
    third transmitting code configured to cause the at least one processor to transmit, from the EES to the AP, a list of a plurality of edge application servers (EAS) including the media streaming capabilities.

16. The device of claim 15, wherein the media processing workflow request is transmitted from the AP to an EAS from among the plurality of EASs based on the list of the plurality of EASs.

17. The device of claim 15, wherein the first capability request is transmitted using an edge application programming interface (API).

18. The device of claim 17, wherein the second capability request is transmitted using a media streaming API.

19. A non-transitory computer-readable medium storing instructions, the instructions comprising: one or more instructions that, when executed by one or more processors of a device for managing capabilities of a media streaming network, cause the one or more processors to:
    receive a capability request for media streaming capabilities of an edge data network (EDN);
    determine the media streaming capabilities of the EDN;
    transmit a capability response based on the determined media streaming capabilities;
    receive a media processing workflow request based on the capability response;
    establish a media streaming session according to the media processing workflow request; and
    stream media content based on the media streaming session,
    wherein the capability request is received by a 5G media streaming (MS) application function (AF) from a media streaming application provider (AP),
    wherein a confirmation, based on a list of a plurality of edge application servers (EASs) and any of environmental characteristics, a throughput and delay range, media processing function libraries, and input/output formats of functions, is transmitted from the 5GMS AF and to the AP through an edge discovery function (EDF) included in the AP,
    wherein a first capability request and a second capability request are transmitted by different application programming interfaces (APIs), and
    wherein the capability request is one of the first capability request and the second capability request.

20. The non-transitory computer-readable medium of claim 19, wherein the media streaming capabilities relate to at least one media content transcoding, content protection, advertisement insertion, closed captioning, of available hardware resources, environmental characteristics of the EDN, a current throughput of an edge server associated with the EDN, and a current delay range of the edge server.

* * * * *